(12) United States Patent
Amasaki et al.

(10) Patent No.: US 8,541,488 B2
(45) Date of Patent: Sep. 24, 2013

(54) FORMED RESIN ARTICLE AND POLYMER FILM

(75) Inventors: Ichiro Amasaki, Odawara (JP); Keizo Kimura, Odawara (JP); Youichiro Takeshima, Odawara (JP)

(73) Assignee: FUJIFILM Corporation, Minato-Ku, Tokyo (JP)

( * ) Notice: Subject to any disclaimer, the term of this patent is extended or adjusted under 35 U.S.C. 154(b) by 138 days.

(21) Appl. No.: 12/934,094

(22) PCT Filed: Mar. 24, 2009

(86) PCT No.: PCT/JP2009/055814
§ 371 (c)(1),
(2), (4) Date: Sep. 23, 2010

(87) PCT Pub. No.: WO2009/122968
PCT Pub. Date: Oct. 8, 2009

(65) Prior Publication Data
US 2011/0092619 A1 Apr. 21, 2011

(30) Foreign Application Priority Data

Mar. 30, 2008 (JP) .................................. 2008-088954
Nov. 5, 2008 (JP) .................................. 2008-284545
Feb. 6, 2009 (JP) .................................. 2009-026031

(51) Int. Cl.
*C08K 5/00* (2006.01)
*C08K 5/34* (2006.01)
*C08K 5/35* (2006.01)
*C08K 5/45* (2006.01)
*C08K 5/3492* (2006.01)

(52) U.S. Cl.
USPC .................. 524/82; 524/83; 524/84; 524/86; 524/87; 524/91; 524/94; 524/95; 524/97

(58) Field of Classification Search
USPC ................ 524/87, 84, 91, 82, 83, 86, 94, 95, 524/97
See application file for complete search history.

(56) References Cited

U.S. PATENT DOCUMENTS

| 4,189,866 A | 2/1980 | Treadaway |
| 4,446,262 A * | 5/1984 | Okumura et al. ................ 524/89 |
| 2003/0096889 A1 * | 5/2003 | Sarkar ............................ 524/87 |

FOREIGN PATENT DOCUMENTS

| CN | 1409738 A | 4/2003 |
| JP | 7-011231 A | 1/1995 |
| JP | 7-011232 A | 1/1995 |
| JP | 2002-225195 A | 8/2002 |
| JP | 2006-188578 A | 7/2006 |
| JP | 2007-119613 A | 5/2007 |
| JP | 2008-195830 A | 8/2008 |
| JP | 2008-273927 A | 11/2008 |
| WO | WO 01/42347 A1 | 6/2001 |

OTHER PUBLICATIONS

International Search Report (PCT/ISA/210) for PCT/JP2009/055814 dated Jun. 16, 2009.
Written Opinion of the International Search Authority (PCT/ISA/237) issued in corresponding International Application No. PCT/JP2009/055814 on Jun. 16, 2009 by Japanese Patent Office, and English Translation.
Office Action issued in corresponding Chinese Patent Application No. 200980111583.2 dated Oct. 29, 2012 with English Translation.
Supplementary European Search Report dated Dec. 2, 2011, issued in the corresponding European Patent Application No. 09727779.2.

\* cited by examiner

*Primary Examiner* — Kriellion Sanders
(74) *Attorney, Agent, or Firm* — Buchanan Ingersoll & Rooney PC

(57) ABSTRACT

A formed resin article, containing a compound and a polymer substance,
wherein the compound has a maximum absorption wavelength in a range of 400 nm or less, measured in a solution of the compound,
wherein the compound is contained in the polymer substance in a quantity of 5 g/m$^2$ or less, and
wherein a light transmittance of the article at a wavelength of 410 nm is 5% or less.

12 Claims, No Drawings

FORMED RESIN ARTICLE AND POLYMER FILM

TECHNICAL FIELD

The present invention relates to a light-resistant polymer film and a light-resistant formed resin article that are each capable of shielding against ultraviolet rays.

BACKGROUND ART

Thermoplastic resin films have so broad utility that they have been used in a wide range of technical fields and conditions. Thermoplastic resins such as polyester-based, polyamide-based, polyolefin-based, polyether-based, or polystyrene-based resins deteriorate or decompose by the effect of ultraviolet rays, which results in discoloration and reduction of mechanical strength. Therefore, thermoplastic resins may be detrimental to a long-term usage. Accordingly, various kinds of ultraviolet absorbent have been conventionally used in order to prevent deterioration. Thermoplastic resin films containing ultraviolet absorbents have been used in such a wide range as a window seal, a plastic greenhouse, or protection from insects.

In the areas of inks, medicines and foods, it is known that these goods are deteriorated by a light of ultraviolet range (380 nm or less), or visible short wavelength range (380 nm to 410 nm). However, the subject itself of a film capable of cutting off a specific wavelength has not yet been well known before.

From the past, there are films in which a benzophenone-based or benzotriazole-based ultraviolet absorbent or a metal oxide is incorporated. However, these films had only the ultraviolet absorbing capacity of 380 nm or less, and were unable to absorb light of visible short wavelength region ranging from 380 nm to 410 nm. Resultantly, these films may not have sufficient effect. Further, in some of these films, precipitation or decomposition of the ultraviolet absorbent is caused by heat. Therefore, with respect to some of these films, their ultraviolet absorbing capacity may be down by half during hot forming. Further, some of these films may be unsuitable for hot forming.

Further, it is necessary to add a fairly-high concentration of an ultraviolet absorbent in order to cut off ultraviolet rays over a wide range of from a short wavelength to a long wavelength. However, a simple addition of the ultraviolet absorbent in a high concentration causes problem such as precipitation or bleed-out of the ultraviolet absorbent, arising from a long term use. Further, some of the benzophenone-based or benzotriazole-based ultraviolet absorbents may have properties of skin irritancy or bioaccumulation. Therefore, an extreme caution is required in use.

[Patent Document 1] JP-A-7-11231 ("JP-A" means unexamined published Japanese patent application)
[Patent Document 2] JP-A-7-11232
[Patent Document 3] JP-A-2006-188578

DISCLOSURE OF INVENTION

The present invention is to address the above-described problems. Accordingly, the present invention provides a polymer film and a formed resin article each containing an ultraviolet-absorbing compound capable of maintaining a long-wavelength ultraviolet absorbing capacity for a long period of time.

As a result of close studies on heterocyclic compounds, the present inventors have found a compound having a structure hitherto unknown and having a high light fastness, and also capable of absorbing ultraviolet rays of a long-wavelength range that cannot be covered by a hitherto known ultraviolet absorbent. Further, they have found that a film containing the above-described compound effectively functions as a light resistant film. The present invention has been made on the basis of these findings.

According to the present invention, there is provided the following means:

<1> A formed resin article, comprising a compound and a polymer substance, wherein the compound has a maximum absorption wavelength in a range of 400 nm or less, measured in a solution of the compound,
wherein the compound is contained in the polymer substance in a quantity of 5 g/m$^2$ or less, and
wherein a light transmittance of the article at a wavelength of 410 nm is 5% or less.

<2> The formed resin article described in <1>, wherein a light transmittance at a wavelength of 440 nm is 80% or more.

<3> The formed resin article described in <1> or <2>, wherein a light transmittance at a wavelength of 430 nm is 70% or more.

<4> The formed resin article described in any one of the above items <1> to <3>, wherein the compound is a compound represented by formula (1):

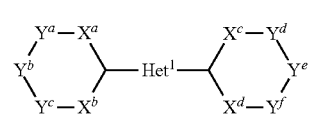

Formula (1)

wherein Het$^1$ represents a bivalent five- or six-membered aromatic heterocyclic residue, and the aromatic heterocyclic residue may further be substituted;
X$^a$, X$^b$, X$^c$, and X$^d$ each independently represent a heteroatom, and X$^a$ to X$^d$ may further be substituted;
Y$^a$, Y$^b$, Y$^c$, Y$^d$, Y$^e$, and Y$^f$ each independently represent a heteroatom or a carbon atom, and Y$^a$ to Y$^f$ may further be substituted;
each of the rings bonding to Het$^1$ may have a double bond at any position.

<5> The formed resin article described in the above item <4>, wherein the compound represented by formula (1) is a compound represented by formula (2):

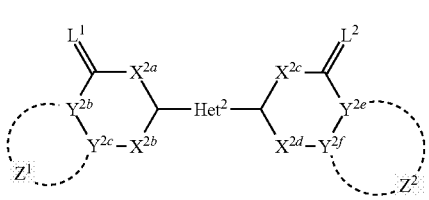

Formula (2)

wherein Het$^2$ has the same meaning as Het$^1$ in formula (1) above;
X$^{2a}$, X$^{2b}$, X$^{2c}$, and X$^{2d}$ each have the same meanings as X$^a$, X$^b$, X$^c$, and X$^d$ in formula (1) above;
Y$^{2b}$, Y$^{2c}$, Y$^{2e}$, and Y$^{2f}$ each have the same meanings as Y$^b$, Y$^c$, Y$^e$, and Y$^f$ in formula (1) above;
L$^1$ and L$^2$ each independently represent an oxygen atom, a sulfur atom, or $=$NR$^a$, where R$^a$ represents a hydrogen atom or a monovalent substituent group;
Z$^1$ and Z$^2$ each independently represent an atomic group needed to form a four- to eight-membered ring together with Y$^{2b}$ and Y$^{2c}$ or with Y$^{2e}$ and Y$^{2f}$.

<6> The formed resin article described in the above item <5>, wherein the compound represented by formula (2) is a compound represented by formula (3):

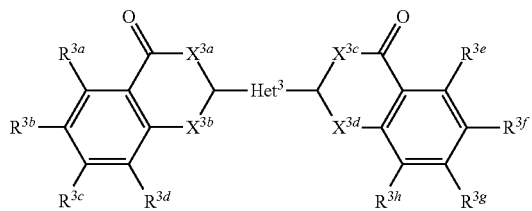

Formula (3)

wherein Het³ has the same meaning as Het² in formula (2) above;

$X^{3a}$, $X^{3b}$, $X^{3c}$, and $X^{3d}$ each have the same meanings $X^{2a}$, $X^{2b}$, $X^{2c}$ and $X^{2d}$ in formula (2) above;

$R^{3a}$, $R^{3b}$, $R^{3c}$, $R^{3d}$, $R^{3e}$, $R^{3f}$, $R^{3g}$, and $R^{3h}$ each independently represent a hydrogen atom or a monovalent substituent group.

<7> The formed resin article described in the above item <6>, wherein the compound represented by formula (3) is a compound represented by formula (4):

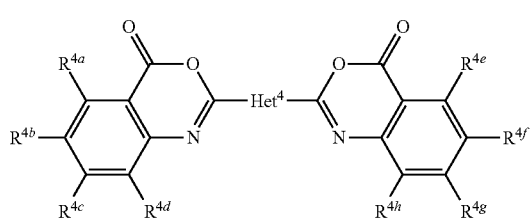

Formula (4)

wherein Het⁴ has the same meaning as Het² in formula (2) above;

$R^{4a}$, $R^{4b}$, $R^{4c}$, $R^{4d}$, $R^{4e}$, $R^{4f}$, $R^{4g}$, and $R^{4h}$ each have the same meanings as $R^{3a}$, $R^{3b}$, $R^{3c}$, $R^{3d}$, $R^{3e}$, $R^{3f}$, $R^{3g}$, and $R^{3h}$ in formula (3) above.

<8> A polymer film, comprising a compound and a polymer substance,
wherein the compound has a maximum absorption wavelength in a range of 400 nm or less, measured in a solution of the compound,
wherein the compound is contained in the polymer substance in a quantity of 5 g/m² or less, and
wherein a light transmittance of the polymer film at a wavelength of 410 nm is 5% or less.

<9> The polymer film described in <8>, wherein a light transmittance at a wavelength of 440 nm is 80% or more.

<10> The polymer film described in <8> or <9>, wherein a light transmittance at a wavelength of 430 nm is 70% or more.

<11> The polymer film described in any one of the above items <8> to <10>, wherein the compound is a compound represented by formula (1):

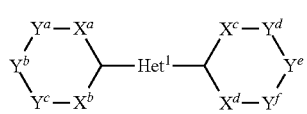

Formula (1)

wherein Het¹ represents a bivalent five- or six-membered aromatic heterocyclic residue, and the aromatic heterocyclic residue may further be substituted;

$X^a$, $X^b$, $X^c$, and $X^d$ each independently represent a heteroatom, and $X^a$ to $X^d$ may further be substituted;

$Y^a$, $Y^b$, $Y^c$, $Y^d$, $Y^e$, and $Y^f$ each independently represent a heteroatom or a carbon atom, and $Y^a$ to $Y^f$ may further be substituted;

each of the rings bonding to Het¹ may have a double bond at any position.

<12> The polymer film described in the above item <11>, wherein, in formula (1), at least one of the ring formed from $X^a$, $X^b$, $Y^a$ to $Y^c$ and a carbon atom and the ring formed from $X^c$, $X^d$, $Y^d$ to $Y^f$ and a carbon atom is a fused ring.

<13> The polymer film described in the above item <11> or <12>, wherein at least one of the ring formed from $X^a$, $X^b$, $Y^a$ to $Y^c$ and a carbon atom and the ring formed from $X^c$, $X^d$, $Y^d$ to $Y^f$ and a carbon atom is not a perimidine ring.

<14> The polymer film described in any one of the above items <11> to <13>, wherein the compound represented by formula (1) is a compound represented by formula (2):

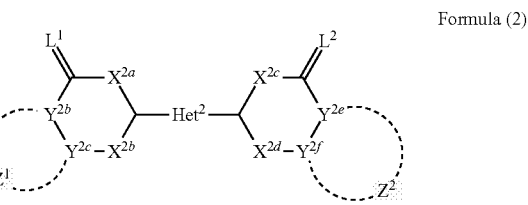

Formula (2)

wherein Het² has the same meaning as Het¹ in formula (1) above;

$X^{2a}$, $X^{2b}$, $X^{2c}$, and $X^{2d}$ each have the same meanings as $X^a$, $X^b$, $X^c$, and $X^d$ in formula (1) above;

$Y^{2b}$, $Y^{2c}$, $Y^{2e}$, and $Y^{2f}$ each have the same meanings as $Y^b$, $Y^c$, $Y^e$, and $Y^f$ in formula (1) above;

$L^1$ and $L^2$ each independently represent an oxygen atom, a sulfur atom, or $=NR^a$, where $R^a$ represents a hydrogen atom or a monovalent substituent group;

$Z^1$ and $Z^2$ each independently represent an atomic group needed to form a four- to eight-membered ring together with $Y^{2b}$ and $Y^{2c}$ or with $Y^{2e}$ and $Y^{2f}$.

<15> The polymer film described in the above item <14>, wherein the compound represented by formula (2) is a compound represented by formula (3):

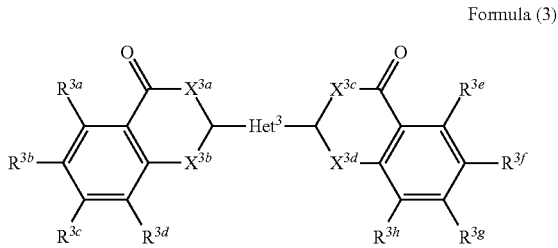

Formula (3)

wherein Het³ has the same meaning as Het² in formula (2) above;

$X^{3a}$, $X^{3b}$, $X^{3c}$, and $X^{3d}$ each have the same meanings as $X^{2a}$, $X^{2b}$, $X^{2c}$, and $X^{2d}$ in formula (2) above;

$R^{3a}$, $R^{3b}$, $R^{3c}$, $R^{3d}$, $R^{3e}$, $R^{3f}$, $R^{3g}$, and $R^{3h}$ each independently represent a hydrogen atom or a monovalent substituent group.

<16> The polymer film described in the above item <15>, wherein the compound represented by formula (3) is a compound represented by formula (4):

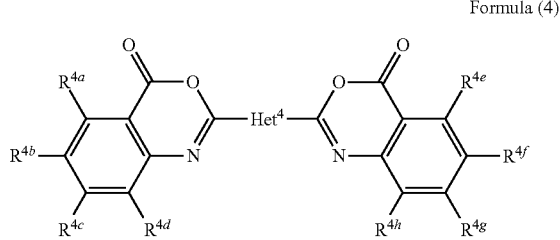

Formula (4)

wherein Het$^4$ has the same meaning as Het$^3$ in formula (3) above;
R$^{4a}$, R$^{4b}$, R$^{4c}$, R$^{4d}$, R$^{4e}$, R$^{4f}$, R$^{4g}$, and R$^{4h}$ each have the same meanings as R$^{3a}$, R$^{3b}$, R$^{3c}$, R$^{3d}$, R$^{3e}$, R$^{3f}$, R$^{3g}$, and R$^{3h}$ in formula (3) above.
<17> The polymer film described in the above item <16>, wherein the compound represented by formula (4) is a compound represented by formula (5):

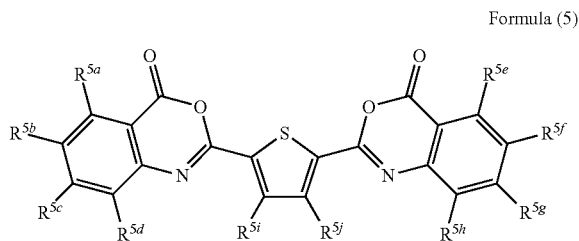

Formula (5)

wherein R$^{5a}$, R$^{5b}$, R$^{5c}$, R$^{5d}$, R$^{5e}$, R$^{5f}$, R$^{5g}$, and R$^{5h}$ each have the same meanings as R$^{4a}$, R$^{4b}$, R$^{4c}$, R$^{4d}$, R$^{4e}$, R$^{4f}$, R$^{4g}$, and R$^{4h}$ in formula (4) above; R$^{5i}$ and R$^{5j}$ each independently represent a hydrogen atom or a monovalent substituent group.
<18> The polymer film described in any one of the above items <8> to <17>, wherein the polymer substance is a polyester, a polycarbonate, or an acrylic resin.
<19> The polymer film described in any one of the above items <8> to <18>, wherein the polymer substance is a polyethylene terephthalate, a polyethylene naphthalate, a polycarbonate, or a polymethylmethacrylate.
<20> A solar cell comprising the polymer film described in any one of the above items <8> to <19>.
<21> An intermediate film comprising the polymer film described in any one of the above items <8> to <19>.
<22> A resin composition comprising a compound represented by formula (1) in a polymer substance:

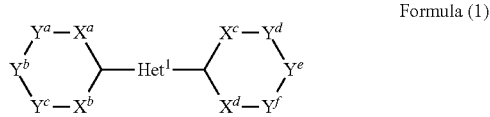

Formula (1)

wherein Het$^1$ represents a bivalent five- or six-membered aromatic heterocyclic residue, and the aromatic heterocyclic residue may further be substituted;
X$^a$, X$^b$, X$^c$, and X$^d$ each independently represent a heteroatom, and X$^a$ to X$^d$ may further be substituted;

Y$^a$, Y$^b$, Y$^c$, Y$^d$, Y$^e$, and Y$^f$ each independently represent a heteroatom or a carbon atom, and Y$^a$ to Y$^f$ may further be substituted;
each of the rings bonding to Het$^1$ may have a double bond at any position.

The formed resin article of the present invention has an excellent light resistance, and therefore can be used for various kinds of applications in which ultraviolet absorption capacity is required. As an example, the polymer film of the present invention can be used for an ultraviolet filter. For example, by attaching the ultraviolet filter on a container, contents that degrade quickly in ultraviolet light can be protected.

Other and further features and advantages of the invention will appear more fully from the following description.

BEST MODE FOR CARRYING OUT INVENTION

The present invention is explained in detail below.
The term "resin composition" used in the present invention is a composition containing a resin and can keep its shape for a definite period of time.
The term "formed resin article" used in the present invention is a formed article containing a resin, and it is not particularly limited in terms of its shape. Specifically, examples of the formed article include a polymer film, a tube, a cup, a plate, a pellet, and a bulky resin.
The formed resin article of the present invention is characterized in that a compound (ultraviolet-absorbing compound) that shows a maximum absorption wavelength in a range of 400 nm or less, measured in solution of the compound, is contained in a polymer substance in a quantity of 5 g/m$^2$ or less, and light transmittance of the formed resin article at a wavelength of 410 nm is 5% or less.
A solution for confirming the maximum absorption wavelength is obtained by dissolving the compound for use in the present invention in an organic or inorganic solvent or water, either singly or as a mixture.
Examples of the organic solvent include amide-based solvents (e.g., N,N-dimethylformamide, N,N-dimethylacetamide, and 1-methyl-2-pyrrolidone), sulfone-based solvents (e.g., sulfolane), sulfoxide-based solvents (e.g., dimethyl sulfoxide), ureido-based solvents (e.g., tetramethylurea), ether-based solvents (e.g., dioxane, tetrahydrofuran, and cyclopentyl methyl ether), ketone-based solvents (e.g., acetone and cyclohexanone), hydrocarbon-based solvents (e.g., toluene, xylene, and n-decane), halogen-based solvents (e.g., tetrachloroethane, chlorobenzene, and chloronaphthalene), alcohol-based solvents (e.g., methanol, ethanol, isopropyl alcohol, ethylene glycol, cyclohexanol, and phenol), pyridine-based solvents (e.g., pyridine, γ-picoline, and 2,6-lutidine), ester-based solvents (e.g., ethyl acetate and butyl acetate), carboxylic acid-based solvents (e.g., acetic acid and propionic acid), nitrile-based solvents (e.g., acetonitrile), sulfonic acid-based solvents (e.g., methanesulfonic acid), and amine-based solvents (e.g., triethylamine and tributylamine). Examples of the inorganic solvent include sulfuric acid and phosphoric acid.

Taking solubility into consideration, amide-based solvents, sulfone-based solvents, sulfoxide-based solvents, ureido-based solvents, ether-based solvents, ketone-based solvents, halogen-based solvents, alcohol-based solvents, ester-based solvents, or nitrile-based solvents are preferable Amide-based solvents, ether-based solvents, ketone-based solvents, halogen-based solvents, alcohol-based solvents, ester-based solvents, and nitrile-based solvents are more preferable. Ether-based solvents, halogen-based solvents, and ester-based solvents are further preferable. Ester-based solvents are particularly preferable. Of the ester-based solvents, ethyl acetate is most preferably used as a solvent.

The concentrations of the compound (I) for measurement are not particularly limited insofar as the maximum absorption wavelength can be confirmed, and are preferably in a range of from $1\times10^{-8}$ to 1 M. The measurement temperatures are not particularly limited, and are preferably from 0° C. to 80° C.

The maximum absorption wavelength of the compound, measured in a solution of the compound, is preferably in the range of 350 nm to 400 nm, more preferably from 360 nm to 400 nm, and most preferably from 370 nm to 400 nm.

The content of the ultraviolet-absorbing compound is preferably 3 g/m$^2$ or less, more preferably 2 g/m$^2$ or less, and further preferably 1 g/m$^2$ or less in particular. Further, from viewpoints of both ultraviolet absorption effect and homogeneous dispersion, the ultraviolet-absorbing compound is contained in an amount ranging preferably from 0.05 to 30% by mass, and more preferably from 0.1 to 20% by mass, based on a total mass of the ultraviolet-absorbing compound and a polymer substance.

With respect to the formed resin article of the present invention, it is preferable that light transmittance at the wavelength of 410 nm is 5% or less, and light transmittance at the wavelength of 440 nm is 80% or more. It is more preferable that light transmittance at the wavelength of 410 nm is 4% or less, and light transmittance at the wavelength of 440 nm is 80% or more. It is further preferable that light transmittance at the wavelength of 410 nm is 3% or less, and light transmittance at the wavelength of 440 nm is 80% or more. It is particularly preferable that light transmittance at the wavelength of 410 nm is 2% or less, and light transmittance at the wavelength of 440 nm is 80% or more.

Further with respect to the formed resin article of the present invention, it is preferable that light transmittance at the wavelength of 410 nm is 5% or less, light transmittance at the wavelength of 430 nm is 70% or more, and light transmittance at the wavelength of 440 nm is 80% or more. It is more preferable that light transmittance at the wavelength of 410 nm is 4% or less, light transmittance at the wavelength of 430 nm is 70% or more, and light transmittance at the wavelength of 440 nm is 80% or more. It is further preferable that light transmittance at the wavelength of 410 nm is 3% or less, light transmittance at the wavelength of 430 nm is 70% or more, and light transmittance at the wavelength of 440 nm is 80% or more. It is particularly preferable that light transmittance at the wavelength of 410 nm is 2% or less, light transmittance at the wavelength of 430 nm is 70% or more, and light transmittance at the wavelength of 440 nm is 80% or more.

Each light transmittance at 410 nm, 430 nm, and 440 nm, can be measured using a spectrophotometer UV-3600 (trade name, manufactured by Shimadzu Corporation).

The ultraviolet-absorbing compound contained in the formed resin article of the present invention is preferably a compound represented by the above-described formula (1).

In formula (1) above, Het$^1$ represents a bivalent and five- or six-membered aromatic heterocyclic residue having at least one hetero atom. Het$^1$ may be a fused ring.

Examples of the hetero atoms include boron, nitrogen, oxygen, silicon, phosphorus, sulfur, selenium, tellurium, and the like atoms, preferably, nitrogen, oxygen and sulfur atoms, more preferably nitrogen and sulfur atoms, and particularly preferably a sulfur atom. When the Het$^1$ has two or more hetero atoms, the hetero atoms may be the same as or different from each other.

Examples of the aromatic heterocycles prepared by adding two hydrogen atoms to the bivalent aromatic heterocyclic residue include pyrrole, pyrazole, imidazole, 1,2,3-triazole, 1,2,4-triazole, pyridine, pyridazine, pyrimidine, pyrazine, 1,3,5-triazine, furan, thiophene, oxazole, isoxazole, thiazole, isothiazole, 1,2,3-oxadiazole, 1,3,4-thiadiazole, and the like. The aromatic heterocycle is preferably pyrrole, pyridine, furan, or thiophene, more preferably pyridine or thiophene, and particularly preferably thiophene. The position of the aromatic heterocycle where the hydrogen atom is abstracted is arbitrary. For example, in the case of a five-membered heterocyclic compound pyrrole, the positions are, for example, 2- and 3-positions, 2- and 4-positions, 2- and 5-positions, 3- and 4-positions, and 3- and 5-positions; and in the case of thiophene, the positions are, for example, 2- and 3-positions, 2- and 4-positions, 2- and 5-positions, 3- and 4-positions, and 3- and 5-positions. Among these, 2- and 5-positions, 2- and 4-positions, and 3- and 4-positions are preferable; and more preferable 2- and 5-positions and 3- and 4-positions; and particularly preferably 2- and 5-positions. Alternatively, in the case of a six-membered heterocyclic compound pyridine, the positions are 2- and 3-positions, 2- and 4-positions, 2- and 5-positions, 2- and 6-positions, 3- and 4-positions, 3- and 5-positions, and 3- and 6-positions. Among these, 2- and 5-positions, 2- and 6-positions, and 3- and 5-positions are preferable; and more preferably 2- and 5-positions and 2- and 6-positions; and particularly preferably 2- and 5-positions.

The aromatic heterocyclic residue Het$^1$ may have a substituent group(s). The substituent group is, for example, a monovalent substituent group. Examples of the monovalent substituent group (hereinafter, referred to as R) include halogen atoms (e.g., fluorine atom, chlorine atom, bromine atom, and iodine atom), alkyl groups having 1 to 20 carbon atoms (e.g., methyl and ethyl), aryl groups having 6 to 20 carbon atoms (e.g., phenyl and naphthyl), a cyano group, a carboxyl group, alkoxycarbonyl groups (e.g., methoxycarbonyl), aryloxycarbonyl groups (e.g., phenoxycarbonyl), substituted or unsubstituted carbamoyl groups (e.g., carbamoyl, N-phenylcarbamoyl, and N,N-dimethylcarbamoyl), alkylcarbonyl groups (e.g., acetyl), arylcarbonyl groups (e.g., benzoyl), a nitro group, substituted or unsubstituted amino groups (e.g., amino, dimethylamino, and anilino), acylamino groups (e.g., acetamido and ethoxycarbonylamino), sulfonamido groups (e.g., methane sulfonamido), imido groups (e.g., succinimido and phthalimido), imino groups (e.g., benzylideneamino), a hydroxy group, alkoxy groups having 1 to 20 carbon atoms (e.g., methoxy), aryloxy groups (e.g., phenoxy), acyloxy groups (e.g., acetoxy), alkylsulfonyloxy groups (e.g., methanesulfonyloxy), arylsulfonyloxy groups (e.g., benzenesulfonyloxy), a sulfo group, substituted or unsubstituted sulfamoyl groups (e.g., sulfamoyl and N-phenylsulfamoyl), alkylthio groups (e.g., methylthio), arylthio groups (e.g., phenylthio), alkylsulfonyl groups (e.g., methanesulfonyl), arylsulfonyl groups (e.g., benzenesulfonyl), heterocyclic groups having 6 to 20 carbon atoms (e.g., pyridyl, morpholino), and the like. The substituent group may be further substituted, and the multiple substituent groups, if present, may be the same as or different from each other. The substituent groups then are, for example, the monovalent substituents R described above. The substituent groups may bind to each other to form a ring.

The substituent group is preferably an alkyl group, an alkoxy group, or an aryl group, more preferably an alkyl or aryl group, and particularly preferably an alkyl group.

$X^a$, $X^b$, $X^c$, and $X^d$ each independently represent a heteroatom. Examples of the heteroatoms include boron, nitrogen, oxygen, silicon, phosphorus, sulfur, selenium, tellurium, and the like; preferably, nitrogen, oxygen and sulfur atoms; more preferably nitrogen and oxygen atoms. $X^a$ to $X^d$ may have a substituent group(s). The substituent groups then are, for example, the monovalent substituents R described above.

$Y^a$, $Y^b$, $Y^c$, $Y^d$, $Y^e$, and $Y^f$ each independently represent a heteroatom or a carbon atom. The atoms constituting $Y^a$ to $Y^f$ include, for example, carbon atom, nitrogen atom, oxygen atom, sulfur atom and the like. The atoms constituting $Y^a$ to $Y^f$ are preferably carbon atom, nitrogen atom, and oxygen atom, more preferably carbon atom and nitrogen atom, still more preferably carbon atom, and particularly preferably all carbon atoms. The atom may further be substituted, and the substituent groups may bind to each other to form a ring, which may additionally be fused with another ring. The substituent groups then are, for example, the monovalent substituents R described above.

The ring formed from $X^a$, $X^b$, $Y^a$ to $Y^c$ and a carbon atom and the ring formed from $X^c$, $X^d$, $Y^d$ to $Y^f$ and a carbon atom (i.e. the two rings binding to the aromatic heterocyclic residue represented by $Het^1$) each may have a double bond at any position. At least one of the two rings preferably has a fused ring. In addition, at least one of the two rings is preferably not a perimidine ring.

Specific examples of the compounds are shown in the following Tables 1 to 6, as the ring formed from $X^a$, $X^b$, $Y^a$ to $Y^c$ and a carbon atom is designated as A, the aromatic heterocyclic residue represented by $Het^1$ as Het, and the ring formed from $X^c$, $X^d$, $Y^d$ to $Y^f$ and a carbon atom as B.

In the Tables 1 to 6, "Me" represents a methyl group, "Et" represents an ethyl group, and "Ph" represents a phenyl group.

TABLE 2-continued
| A | Het | B |
|---|---|---|
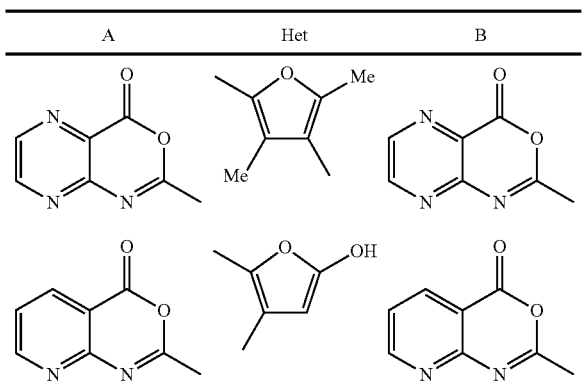
TABLE 2-continued
| A | Het | B |
|---|---|---|
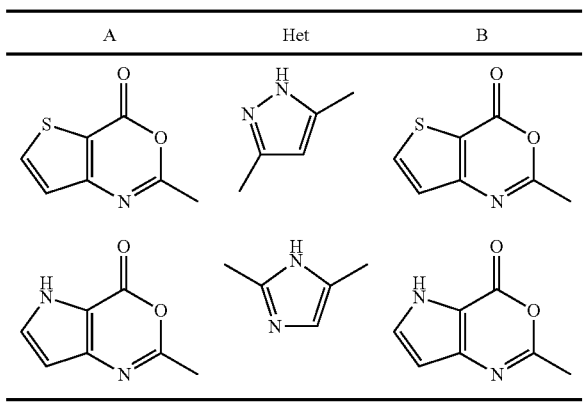
TABLE 3
| A | Het | B |
|---|---|---|
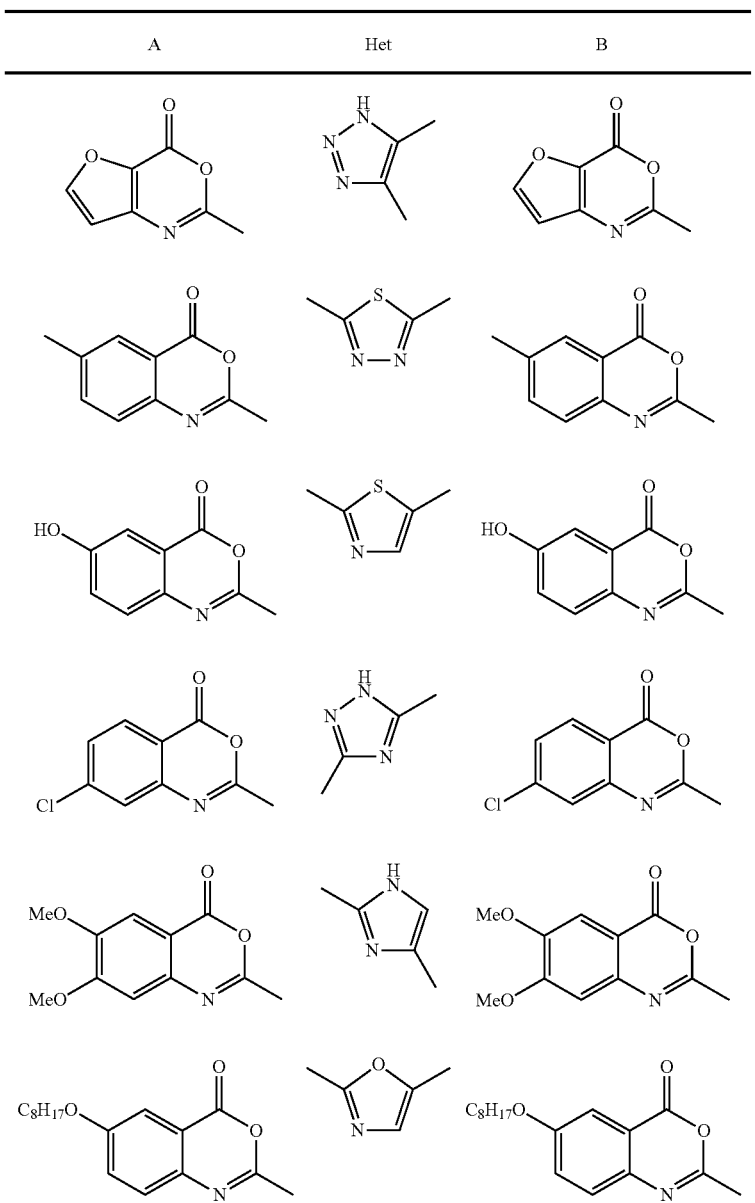

TABLE 3-continued
| A | Het | B |
|---|-----|---|
| | | |
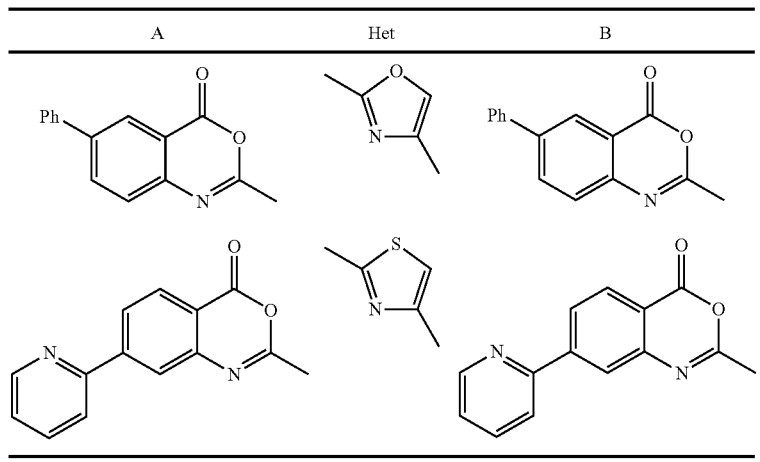
TABLE 4
| A | Het | B |
|---|-----|---|
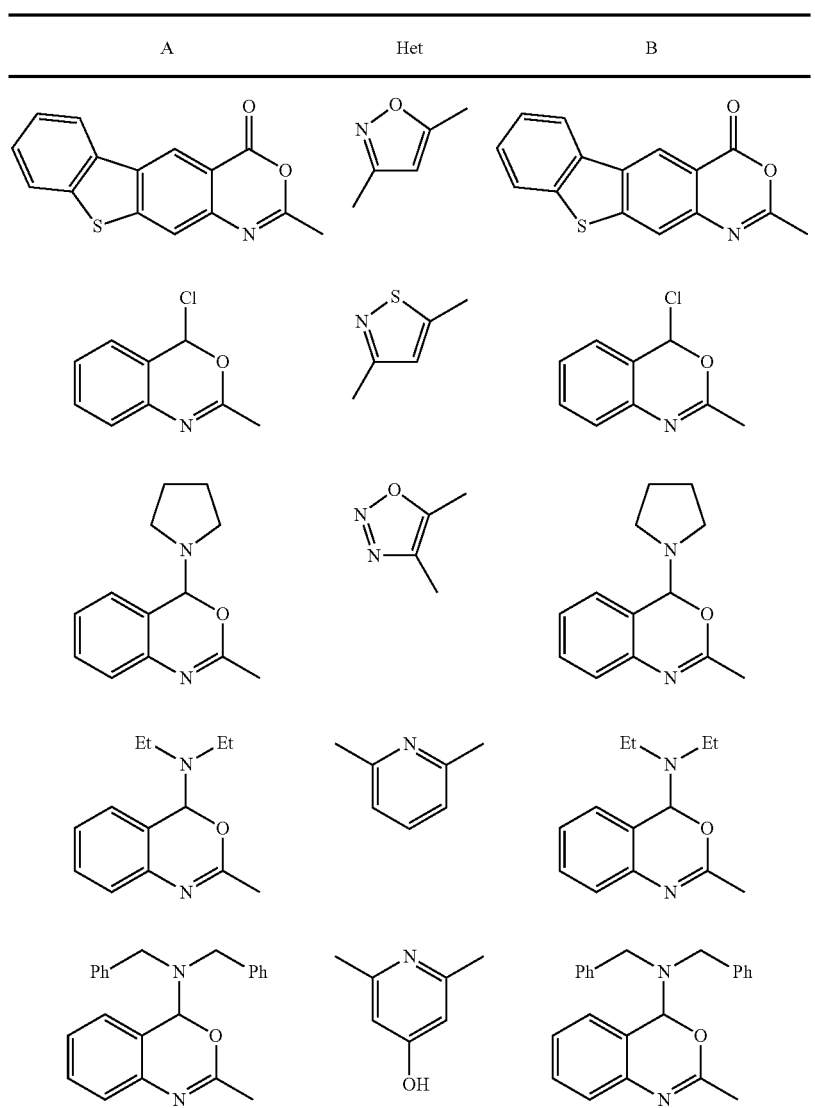

TABLE 4-continued

| A | Het | B |
|---|-----|---|
| (benzoxazine with SEt) | 2,6-dimethyl-3-methylpyridine | (benzoxazine with SEt) |
| (benzoxazine with OMe) | 2,5-dimethylpyridine | (benzoxazine with OMe) |
| (oxazinone) | 2,3,4,6-tetramethylpyridine | (oxazinone) |

TABLE 5

| A | Het | B |
|---|-----|---|
| (Me,Me-oxazinone) | 2,4-dimethylpyrimidine | (Me,Me-oxazinone) |
| (Ph,Br-oxazinone) | 4-bromo-2,5-dimethylpyrimidine | (Ph,Br-oxazinone) |
| (Me,Me-dioxane) | 2,5-dimethylpyrazine | (Me,Me-dioxane) |
| (cyclopentane-fused dioxane) | 2,5-dimethylpyrazine | (cyclopentane-fused dioxane) |
| (benzoxazine) | 3,6-dimethylpyridazine | (benzoxazine) |
| (cyclohexane-fused dithiane) | 3,5-dimethylpyridazine | (cyclohexane-fused dithiane) |
| (pyrrolidine-fused oxazine) | 2,4-dimethyltriazine | (pyrrolidine-fused oxazine) |

TABLE 5-continued

| A | Het | B |
|---|-----|---|
| (naphtho-oxazinone) | 1,3-dimethylisoindole | (naphtho-oxazinone) |

TABLE 6

| A | Het | B |
|---|-----|---|
| (benzothiadiazine dioxide N-Me) | 1,3-dimethylisobenzofuran | (benzothiadiazine dioxide N-Me) |
| (2,4-diphenyltriazine) | 1,3-dimethylbenzothiophene | (2,4-diphenyltriazine) |
| (indole-fused oxazinone N-Me) | 1,4-dimethylisoquinoline | (indole-fused oxazinone N-Me) |

TABLE 6-continued

| A | Het | B |
|---|---|---|

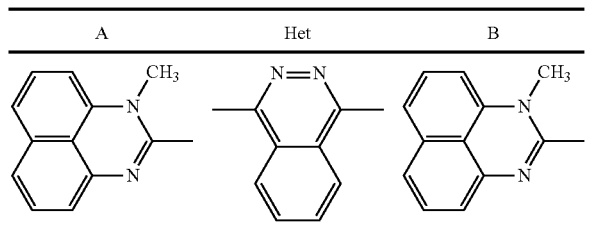

The compound represented by formula (1) is preferably a compound represented by formula (2) above. Hereinafter, the compound represented by the formula (2) above will be described in detail.

$Het^2$ has the same meaning as $Het^1$ in formula (1) above and the favorable examples thereof are also the same.

$X^{2a}$, $X^{2b}$, $X^{2c}$, and $X^{2d}$ have the same meanings as $X^a$, $X^b$, $X^c$, and $X^d$ in formula (1) above and the favorable examples thereof are also the same. $X^{2a}$, $X^{2b}$, $X^{2c}$, and $X^{2d}$ may be the same as or different from each other. The combinations of $X^{2a}$ and $X^{2b}$ and of $X^{2c}$ and $X^{2d}$ are more preferably respectively the same as each other, and particularly preferred is the case where $X^{2a}$ and $X^{2c}$ are oxygen atoms and $X^{2b}$ and $X^{2d}$ are nitrogen atoms.

$Y^{2b}$, $Y^{2c}$, $Y^{2e}$, and $Y^{2f}$ each have the same meanings as $Y^b$, $Y^c$, $Y^e$, and $Y^f$ in formula (1) above and the favorable examples thereof are also the same.

$L^1$ and $L^2$ each independently represent an oxygen atom, a sulfur atom, or $=NR^a$ ($R^a$ represents a hydrogen atom or a monovalent substituent group. The substituent group is, for example, the monovalent substituent R described above), preferably an oxygen atom or $=NR^a$; and more preferably an oxygen atom. $L^1$ and $L^2$ may be the same as or different from each other, but preferably the same. In particular, $L^1$ and $L^2$ are particularly favorably both oxygen atoms.

$Z^1$ and $Z^2$ each independently represent an atomic group needed for forming a four- to eight-membered ring together with $Y^{2b}$ and $Y^{2c}$ or with $Y^{2e}$ and $Y^{2f}$. These rings may have a substituent group(s), which may further have a fused ring. Examples of the rings formed include aliphatic hydrocarbon rings such as cyclohexane and cyclopentane; aromatic hydrocarbon rings such as benzene and naphthalene; and heterocycles such as pyridine, pyrrole, pyridazine, thiophene, imidazole, furan, pyrazole, oxazole, triazole, thiazole, or the benzo-fused rings thereof, and the like. Preferable are aromatic hydrocarbon rings and heterocycles. More preferable are aromatic hydrocarbon rings, and particularly preferable is a benzene ring.

Further, the compound represented by formula (2) is preferably a compound represented by formula (3) above. Hereinafter, the compound represented by the formula (3) above will be described in detail.

$Het^3$ has the same meaning as $Het^2$ in formula (2) above, and the favorable examples thereof are also the same.

$X^{3a}$, $X^{3b}$, $X^{3c}$, and $X^{3d}$ each have the same meanings as $X^{2a}$, $X^{2b}$, $X^{2c}$, and $X^{2d}$ in formula (2) above, and the favorable examples thereof are also the same. $X^{3a}$, $X^{3b}$, $X^{3c}$, and $X^{3d}$ may be the same as or different from each other. The combinations of $X^{3a}$ and $X^{3b}$ and of $X^{3c}$ and $X^{3d}$ are more preferably respectively the same as each other, and particularly preferred is the case where $X^{3a}$ and $X^{3c}$ are oxygen atoms and $X^{3b}$ and $X^{3d}$ are nitrogen atoms.

$R^{3a}$, $R^{3b}$, $R^{3c}$, $R^{3d}$, $R^{3e}$, $R^{3f}$, $R^{3g}$, and $R^{3h}$ each independently represent a hydrogen atom or a monovalent substituent group. As the substituent groups in this case, for example, the monovalent substituents R described above can be mentioned. Any two substituent groups among $R^{3a}$ to $R^{3d}$ and among $R^{3e}$ to $R^{3h}$ may bind to each other to form a ring, which may have additionally a fused ring. $R^{3a}$ to $R^{3h}$ each preferably represent a hydrogen atom, an alkyl group having 10 or less carbon atoms, an alkoxy group having 10 or less carbon atoms, or a hydroxy group; more preferably a hydrogen atom or an alkoxy group having 10 or less carbon atoms; still more preferably a hydrogen atom, and particularly preferred is the case where $R^{3a}$ to $R^{3h}$ are all hydrogen atoms.

Further, the compound represented by formula (3) is preferably a compound represented by formula (4) above. Hereinafter, the compound represented by the formula (4) above will be described in detail.

$Het^4$ has the same meaning as $Het^3$ in formula (3) above, and the favorable examples thereof are also the same.

$R^{4a}$, $R^{4b}$, $R^{4c}$, $R^{4d}$, $R^{4e}$, $R^{4f}$, $R^{4g}$, and $R^{4h}$ each have the same meanings as $R^{3a}$, $R^{3b}$, $R^{3c}$, $R^{3d}$, $R^{3e}$, $R^{3f}$, $R^{3g}$, and $R^{3h}$ in formula (3) above, and the favorable examples thereof are also the same.

Further, the compound represented by formula (4) is preferably a compound represented by formula (5) above. Hereinafter, the compound represented by the formula (5) above will be described in detail.

$Het^5$ has the same meaning as $Het^4$ in formula (4) above, and the favorable examples thereof are also the same.

$R^{5a}$, $R^{5b}$, $R^{5c}$, $R^{5d}$, $R^{5e}$, $R^{5f}$, $R^{5g}$, and $R^{5h}$ each have the same meanings as $R^{4a}$, $R^{4b}$, $R^{4c}$, $R^{4d}$, $R^{4e}$, $R^{4f}$, $R^{4g}$, and $R^{4h}$ in formula (4) above and the favorable examples thereof are also the same.

$R^{5i}$ and $R^{5j}$ each independently represent a hydrogen atom or a monovalent substituent group. As the substituent groups in this case, for example, the monovalent substituents R described above can be mentioned. $R^{5i}$ and $R^{5j}$ may bind to each other to form a ring, which may have additionally a fused ring. $R^{5i}$ and $R^{5j}$ each preferably represent a hydrogen atom, an alkyl group having 10 or less carbon atoms, an alkoxy group having 10 or less carbon atoms, or a hydroxy group; more preferably a hydrogen atom or an alkoxy group having 10 or less carbon atoms; still more preferably a hydrogen atom, and particularly preferred is the case where $R^{5i}$ and $R^{5j}$ are both hydrogen atoms.

Hereinafter, specific examples of the compounds represented by any one of formulae (1) to (5) will be described below, but the present invention is not restricted to these.

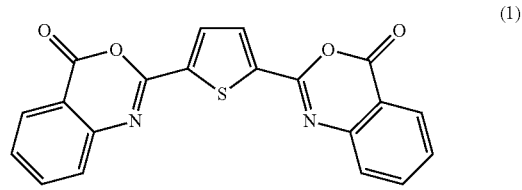

(1)

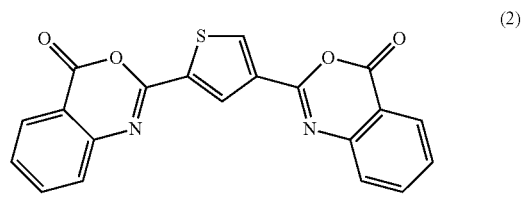

(2)

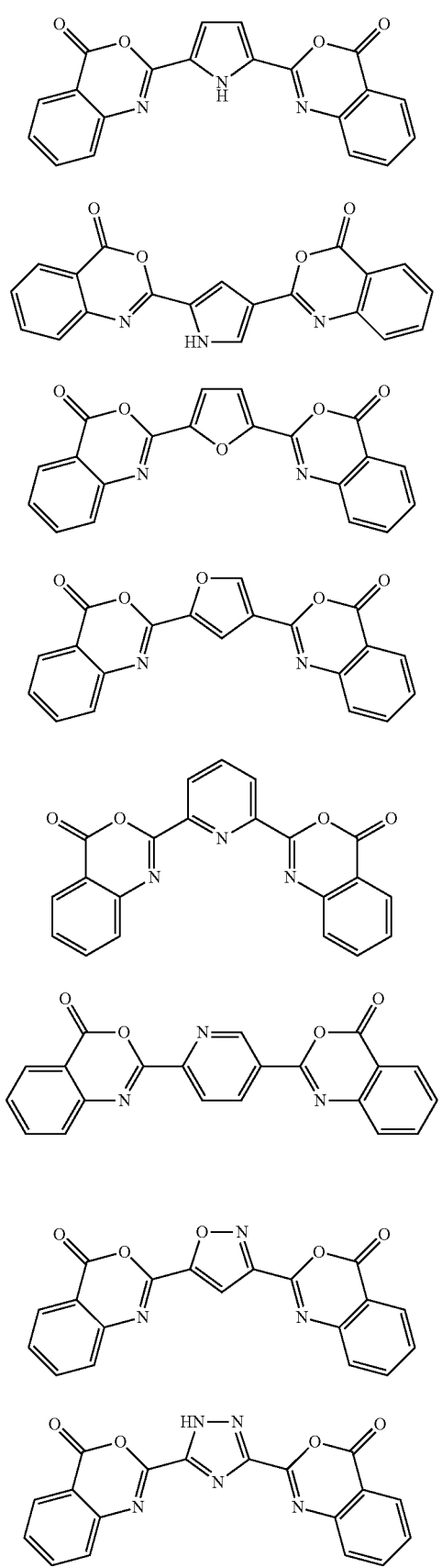
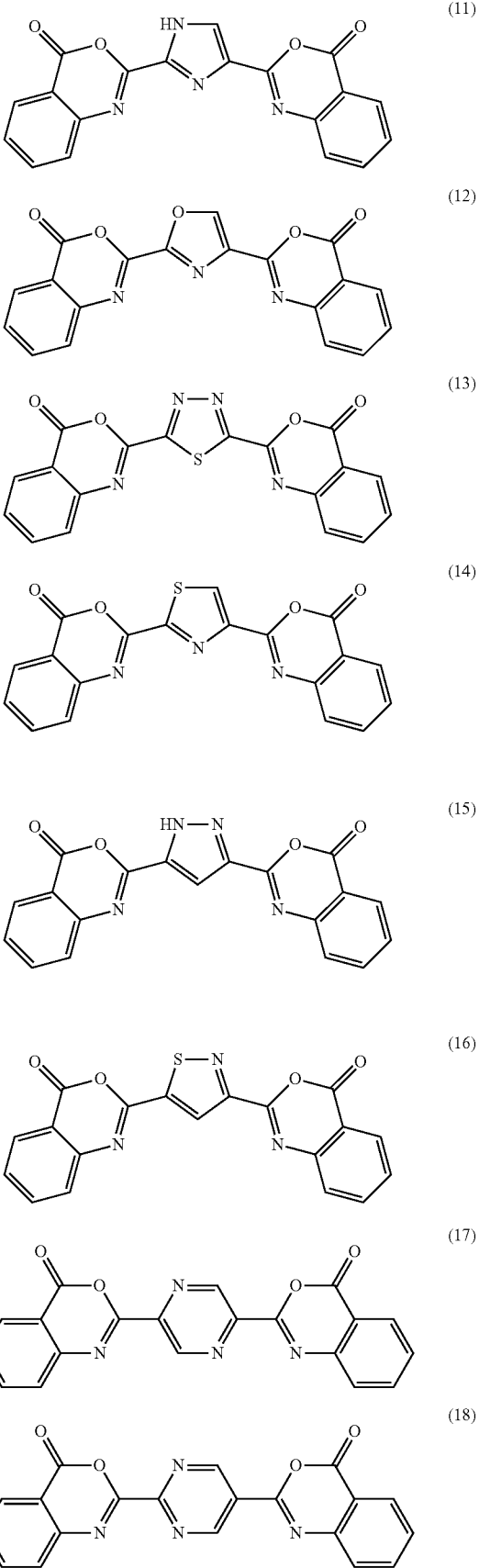

(19) 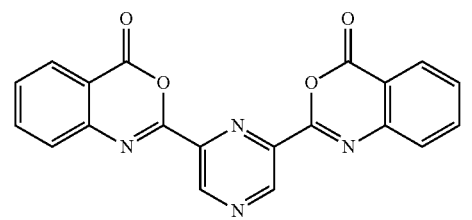
(20) 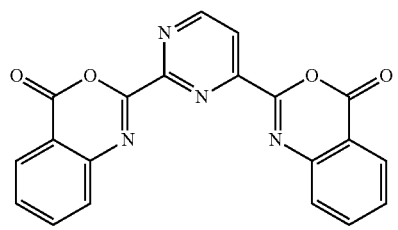
(21) 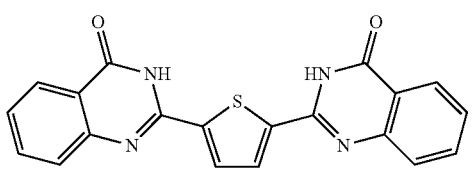
(22) 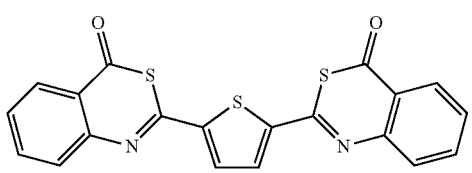
(23) 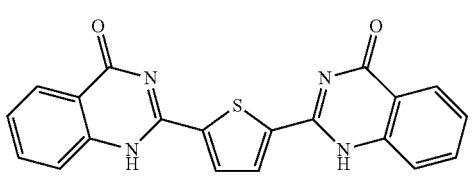
(24) 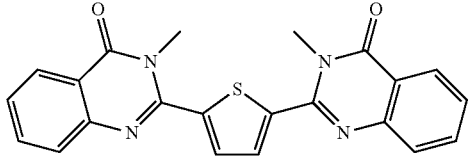
(25) 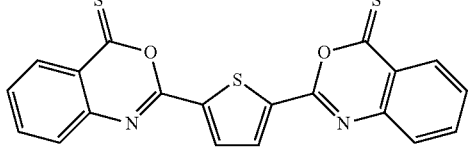
(26) 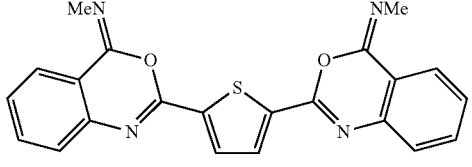
(27) 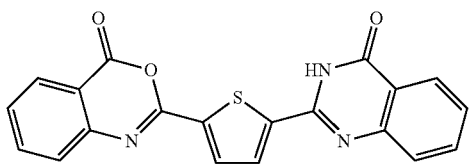
(28) 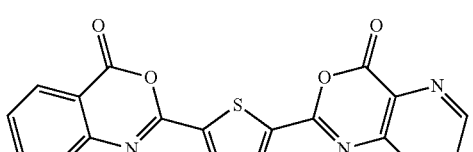
(29) 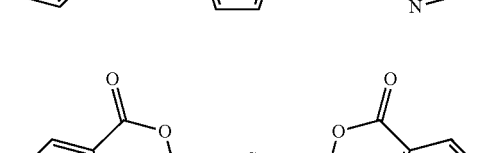
(30) 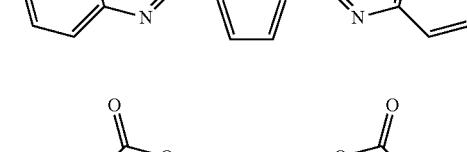
(31) 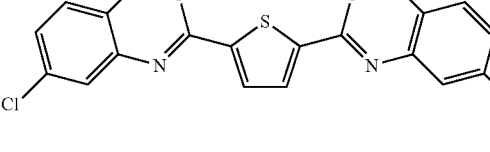
(32) 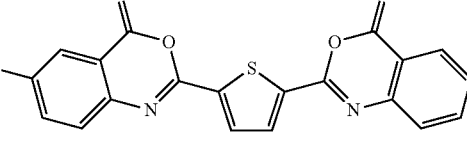
(33) 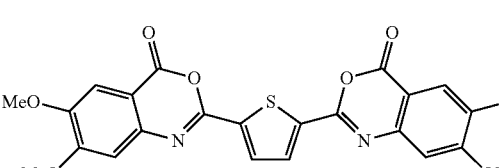
(34) 

(35)
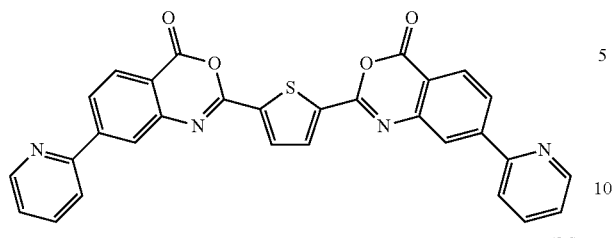
(36)
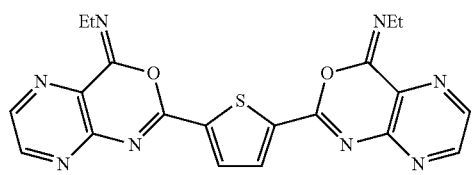
(37)
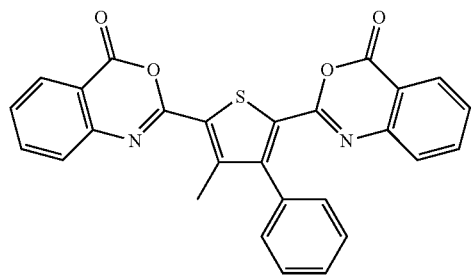
(38)
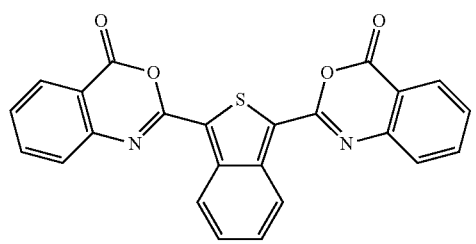
(39)
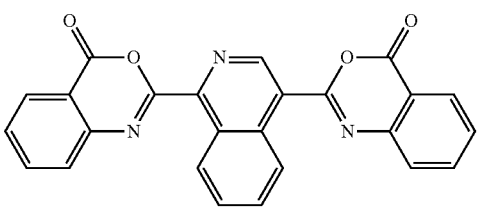
(40)
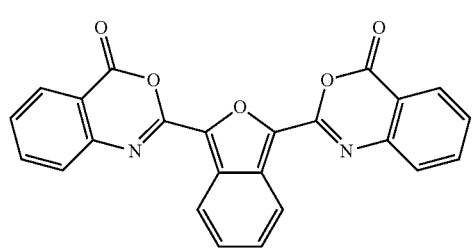
(41)
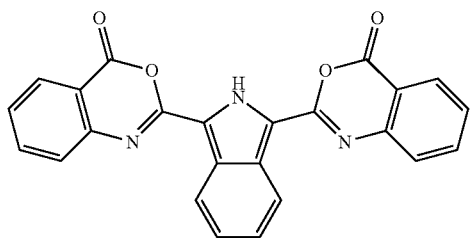
(42)
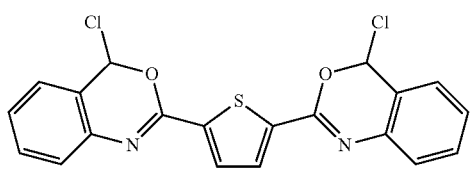
(43)
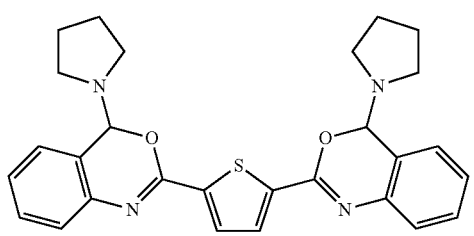
(44)
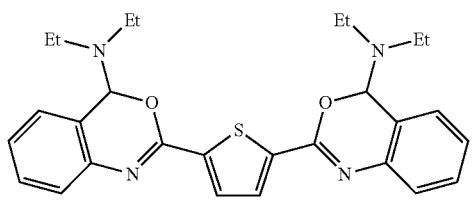
(45)
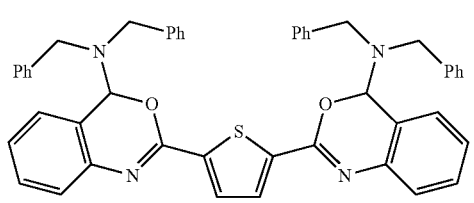
(46)
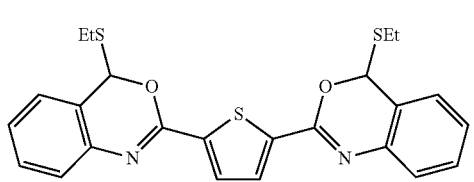
(47)
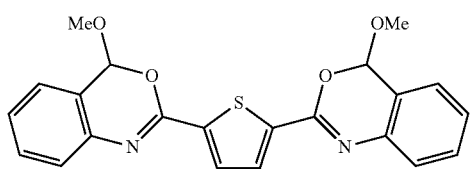
(48)
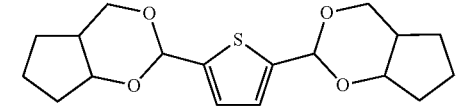

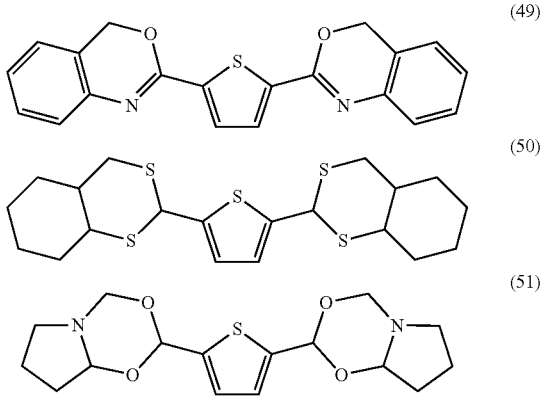

The compound represented by any one of formulae (1) to (5) may be prepared by any method. Examples of the methods include those disclosed in known patent documents and non-patent documents, specifically those described in the Examples of JP-A-2000-264879, p. 4. left line 43 to right line 8; in the Examples of JP-A-2003-155375, p. 4, right column lines 5 to 30; "Bioorganic & Medicinal Chemistry", 2000, vol. 8, p. 2095-2103, "Bioorganic & Medicinal Chemistry Letters", 2003, vol. 13, p. 4077-4080, and others. For example, exemplary compound (15) can be prepared in a reaction of 3,5-pyrazole dicarbonyl dichloride with anthranilic acid. Alternatively, exemplary compound (32) can be prepared in a reaction of 2,5-thiophenedicarbonyl dichloride with 4,5-dimethoxyanthranilic acid.

The compound represented by any one of formulae (1) to (5) may have tautomers depending on the structure and the environment where the compound is located. A typical form thereof is described here in the present invention, but the tautomers different from that described in the present invention are also included in the compound for use in the present invention.

The compound represented by any one of formulae (1) to (5) may have an isotopic element (such as $^2H$, $^3H$, $^{13}C$, $^{15}N$, $^{17}O$, or $^{18}O$).

The compound represented by any one of formulae (1) to (5) is particularly suitable for use in stabilizing an organic material against damage by light, oxygen, or heat. In particular, it is favorably used as a light stabilizer, particularly favorably as an ultraviolet absorbent.

Hereinafter, the polymer substance for use in the present invention will be described.

The polymer substance may be a natural or synthetic polymer. Examples thereof include polyolefins (such as polyethylene, polypropylene, polyisobutylene, poly(1-butene), poly-4-methylpentene, polyvinylcyclohexane, polystyrene, poly (p-methylstyrene), poly(α-methylstyrene), polyisoprene, polybutadiene, polycyclopentene, and polynorbornene); copolymers of a vinyl monomer (such as ethylene/propylene copolymer, ethylene/methylpentene copolymer, ethylene/heptene copolymer, ethylene/vinylcyclohexane copolymer, ethylene/cycloolefin copolymer (e.g., cycloolefin copolymer (COC) such as ethylene/norbornene), propylene/butadiene copolymer, isobutylene/isoprene copolymer, ethylene/vinylcyclohexene copolymer, ethylene/alkyl acrylate copolymer, and ethylene/alkyl methacrylate copolymer); acrylic polymers (such as polymethacrylate, polyacrylate, polyacrylamide, and polyacrylonitrile); polyvinyl chloride, polyvinylidene chloride, polyvinyl fluoride, polyvinylidene fluoride, vinyl chloride/vinyl acetate copolymer, polyethers (such as polyalkylene glycol, polyethyleneoxide, and polypropyleneoxide); polyacetals (such as polyoxymethylene); polyamide, polyimide, polyurethane, polyurea, polyesters (such as polyethylene terephthalate (PET) and polyethylene naphthalate (PEN)); polycarbonate (PC), polyketone, polysulfone polyether ketone, phenol resins, melamine resins, cellulose esters (such as diacetylcellulose, triacetylcellulose (TAC), propionylcellulose, butyrylcellulose, acetyl propionylcellulose, and nitrocellulose); poly(vinyl butyral) (PVB), ethylene vinyl acetate (EVA), polyethersulfone (PES), polysiloxane, natural polymers (such as cellulose, rubber, and gelatin), and the like.

The polymer substance for use in the present invention is preferably a synthetic polymer, more preferably a polyolefin, an acrylic polymer, a polyester, a polycarbonate, a poly(vinyl butyral), an ethylene vinyl acetate, a polyethersulfone, or a cellulose ester. Among them, polyethylene, polypropylene, poly(4-methylpentene), polymethyl methacrylate (PMMA), polycarbonate, polyethylene terephthalate, polyethylene naphthalate, polybutylene terephthalate, and triacetylcellulose are particularly preferable.

The polymer substance for use in the present invention is preferably a thermoplastic resin.

Examples of the thermoplastic resins include polyethylene series resins, polypropylene series resins, poly(meth)acrylic ester series resins, polystyrene series resins, styrene-acrylonitrile series resins, acrylonitrile-butadiene-styrene series resins, polyvinyl chloride series resins, polyvinylidene chloride series resins, polyvinyl acetate series resins, polyvinylbutyral series resins (PVB), ethylene-vinyl acetate series copolymers, ethylene-vinylalcohol series resins, polyethylene terephthalate resins (PET), polyethylene naphthalate resins (PEN), polybutylene terephthalate resins (PBT), ethylene vinyl acetate resins (EVA), polyethersulfone resins (PES), liquid crystal polyester resins (LCP), polyacetal resins (POM), polyamide resins (PA), polycarbonate resins (PC), polyurethane resins, polyphenylene sulfide resins (PPS) and the like, and these resins may be used alone or as a polymer blend or polymer alloy of two or more. The resin may be used as a thermoplastic forming material containing a natural resin and additionally a filler such as glass fiber, carbon fiber, semi-carbonized fiber, cellulosic fiber or glass bead, a flame retardant, and the like. As needed, resin additives traditionally used, such as polyolefin series resin fine powder, polyolefin series wax, ethylene bisamide wax, and metal soap, may be used alone or in combination.

When the polymer film of the present invention is used as an ultraviolet-absorbing filter or film, the polymer substance is preferably transparent. Examples of the transparent polymer materials include cellulose esters (such as diacetylcellulose, triacetylcellulose, propionylcellulose, butyrylcellulose, acetyl propionyl cellulose, and nitrocellulose), polyamides, polycarbonates, polyesters (such as polyethylene terephthalate, polyethylene naphthalate, polybutylene terephthalate, poly-1,4-cyclohexane dimethylene terephthalate, polyethylene-1,2-diphenoxyethane-4,4'-dicarboxylate, and polybutylene terephthalate), polystyrenes (such as syndiotactic polystyrene), polyolefins (such as polyethylene, polypropylene, and polymethylpentene), polymethyl methacrylate, syndiotactic polystyrene, polysulfones, polyether sulfones, polyvinylbutyral, ethylene-vinyl acetate, polyether ketones, polyether imides, polyoxyethylene, and the like. Preferred are cellulose esters, polycarbonates, polyesters, polyolefins, and acrylic resins, more preferred are polycarbonates and polyesters, specifically preferred is polyester, and most preferred is polyethylene terephthalate.

In the present invention, two or more kinds of compounds represented by any one of formulae (1) to (5) different in structure may be used in combination. Alternatively, the compound represented by any one of formulae (1) to (5) and one or more kinds of ultraviolet absorbents having a structure other than the structure represented by any one of formulas (1) to (5) may be used in combination. When two kinds (preferably three kinds) of ultraviolet absorbents are used in combination, it becomes possible to absorb ultraviolet ray in a wider wavelength range. In addition, the use of two or more kinds of ultraviolet absorbents in combination has a function to stabilize the dispersion state of the ultraviolet absorbents. The ultraviolet absorbent having a structure other than the structure represented by formulas (1) to (5) is not particularly limited. Examples thereof include structures known for ultraviolet absorbents such as triazine-based, benzotriazole-based, benzophenone-based, merocyanine-based, cyanine-based, dibenzoylmethane-based, cinnamic acid-based, cyanoacrylate-based, and benzoic ester-based compounds. Examples thereof include the ultraviolet absorbents described, for example, in Fine Chemical, May 2004, p. 28 to 38; Survey and Research Dept., Toray Research Center Inc. Ed., "Kobunshi-yo Kinousei-Tenkazai no Shintenkai (Trend of Functional Additives for Polymers)" (Toray Research Center Inc., 1999) p. 96 to 140; and Yasuichi Okatsu Ed., "Kobunshi-tenkazai no Kaihatsu to Kankyo-taisaku (Development of polymer additives and Environmental Measures)" (CMC Publishing, 2003) p. 54 to 64.

Examples of the ultraviolet absorbent having a structure other than the structure represented by formulas (1) to (5) include compounds such as benzotriazole-based, benzophenone-based, salicylic-acid-based, cyanoacrylate-based, and triazine-based compounds. More preferred are benzotriazole-based, benzophenone-based, and triazine-based compounds. Particularly preferable are benzotriazole-based compounds.

The effective absorption wavelength of benzotriazole-based compounds is approximately 270 to 380 nm, and specific examples of the compound include 2-(2'-hydroxy-5'-methylphenyl)benzotriazole, 2-(2'-hydroxy-5'-t-butylphenyl)benzotriazole, 2-(2'-hydroxy-3'-t-butyl-5'-methylphenyl)-5-chlorobenzotriazole, 2-(2'-hydroxy-3',5'-di-t-butylphenyl)-5-chlorobenzotriazole, 2-(2'-hydroxy-3'-t-butyl-5'-(2-(octyloxycarbonyl)ethyl)phenyl)-5-chlorobenzotriazole, 2-(2'-hydroxy-3'-dodecyl-5'-methylphenyl)-5-chlorobenzotriazole, 2-(2'-hydroxy-3',5'-di-t-amylphenyl)benzotriazole, 2-(2'-hydroxy-5'-t-octylphenyl)benzotriazole, 2-(2'-hydroxy-3',5'-di-(dimethylbenzyl)phenyl)benzotriazole, 2-(2'-hydroxy-4'-octyloxyphenyl)benzotriazole, 2,2'-methylene-bis(2-(2'-hydroxy-5'-t-octylphenyl)benzotriazole)-2-(2'-hydroxy-3'-(3,4,5,6-tetrahydrophthalimidylmethyl)-5'-methylbenzyl) phenyl)benzotriazole, and the like.

The effective absorption wavelength of benzophenone-based compounds is approximately 270 to 380 nm, and specific examples of the compound include 2,4-dihydroxybenzophenone, 2-hydroxy-4-methoxybenzophenone, 2-hydroxy-4-octyloxybenzophenone, 2-hydroxy-4-decyloxybenzophenone, 2-hydroxy-4-benzyloxybenzophenone, 2-hydroxy-4-(2-hydroxy-3-methacryloxypropoxy)benzophenone, 2-hydroxy-4-methoxy-5-sulfobenzophenone, 2-hydroxy-4-methoxy-5-sulfobenzophenone trihydrate, 2-hydroxy-4-methoxy-2'-carboxybenzophenone, 2-hydroxy-4-octadecyloxybenzophenone, 2-hydroxy-4-diethylamino-2'-hexyloxycarbonylbenzophenone, 2,2'-dihydroxy-4-methoxybenzophenone, 2,2',4,4'-tetrahydroxybenzophenone, 2,2'-dihydroxy-4,4'-dimethoxybenzophenone, 1,4-bis(4-benzyloxy-3-hydroxyphenoxy)butane, and the like.

The effective absorption wavelength of the salicylic-acid-based compounds is approximately 290 to 330 nm, and typical examples of the compound include phenyl salicylate, p-t-butylphenyl salicylate, p-octylphenyl salicylate, and the like.

The effective absorption wavelength of cyanoacrylate-based compounds is approximately 270 to 350 nm, and specific examples of the compound include 2-ethylhexyl 2-cyano-3,3-diphenylacrylate, ethyl 2-cyano-3,3-diphenylacrylate, hexadecyl 2-cyano-3-(4-methylphenyl)acrylate, salt of 2-cyano-3-(4-methylphenyl)acrylic acid, 1,3-bis(2'-cyano-3,3'-diphenylacryloyl)oxy)-2,2-bis(((2'-cyano-3,3'-diphenylacryloyl)oxy)methyl)propane, and the like.

The effective absorption wavelength of the triazine-based compounds is approximately 270 to 380 nm, and specific examples of the compound include 2-(4-hexyloxy-2-hydroxyphenyl)-4,6-diphenyl-1,3,5-triazine, 2-(4-octyloxy-2-hydroxyphenyl)-4,6-di(2,5-dimethylphenyl)-1,3,5-triazine, 2-(4-butoxy-2-hydroxyphenyl)-4,6-di(4-butoxyphenyl)-1,3,5-triazine, 2-(4-butoxy-2-hydroxyphenyl)-4,6-di(2,4-dibutoxyphenyl)-1,3,5-triazine, 2-(4-(3-(2-ethylhexyloxy)-2-hydroxypropoxy)-2-hydroxyphenyl)-4,6-di(2,4-dimethylphenyl)-1,3,5-triazine, 2-(4-(3-dodecyloxy-2-hydroxypropoxy)-2-hydroxyphenyl)-4,6-di(2,4-dimethylphenyl)-1,3,5-triazine, 2,4-di(4-butoxy-2-hydroxyphenyl)-6-(4-butoxyphenyl)-1,3,5-triazine, 2,4-di(4-butoxy-2-hydroxyphenyl)-6-(2,4-dibutoxyphenyl)-1,3,5-triazine, and the like.

The formed resin article of the present invention may contain any additives such as antioxidant, light stabilizer, processing stabilizer, antidegradant, and compatibilizer, as needed, in addition to the polymer substance above and the ultraviolet absorbing compound (ultraviolet absorbent).

Although the formed resin article of the present invention has a practically sufficient ultraviolet-shielding effect by the use of the aforementioned ultraviolet absorbent, a white pigment which has higher shielding power, such as titanium oxide, may be used in combination in the case where further strict ultraviolet-shielding effect is demanded. In addition, a trace amount (0.05 mass % or less) of colorant may be used additionally, if the appearance or the color tone is of interest or needed to be adjusted for preference. Alternatively, a fluorescent brightener may be used additionally for applications demanding transparency or whiteness. Examples of the fluorescent brighteners include commercialized products, the compounds represented by formula [1] and typical exemplary compounds 1 to 35, described in JP-A-2002-53824, and the like.

The compound represented by any one of formulas (1) to (5) can be contained in the polymer substance in various methods. When the compound represented by any one of formulas (1) to (5) is compatible with the polymer substance, the compound may be added to the polymer substance directly. The compound represented by any one of formulas (1) to (5) may be dissolved in an auxiliary solvent compatible with the polymer substance, and then the obtained solution may be added to the polymer substance. The compound represented by any one of formulas (1) to (5) may be dispersed in a high-boiling point organic solvent or a polymer, and the obtained dispersion may be added to the polymer substance.

The boiling point of the high-boiling point organic solvent is preferably 180° C. or higher, more preferably 200° C. or higher. The melting point of the high-boiling point organic solvent is preferably 150° C. or lower, more preferably 100° C. or lower. Examples of the high-boiling point organic solvents include phosphoric esters, phosphonic esters, benzoic esters, phthalic esters, fatty acid esters, carbonate esters, amides, ethers, halogenated hydrocarbons, alcohols, and paraffins. Phosphoric esters, phosphonic esters, phthalic esters, benzoic esters, and fatty acid esters are preferable.

The method of adding the compound represented by any one of formulas (1) to (5) is determined, by reference to the description in JP-A-58-209735, JP-A-63-264748, JP-A-4-191851, JP-A-8-272058, and British Patent No. 2016017A.

Further, the compounds (ultraviolet absorbents) represented by any of the above-described formulas (1), (2), (3), (4), and (5) may be added during a polymerization process of the polymer substance, or after the polymerization process. When the ultraviolet absorbent is added to the polymer substance in a molten state after the polymerization, the ultraviolet absorbent may be added singly, or may be added in a condition dispersed in a solvent, etc. In this situation, there is no limitation to the solvents to be used, and it may be appropriate that the solvent to be used does not make the resin being kneaded deteriorate but make the ultraviolet absorbent disperse. The examples of these solvents include high boiling organic solvents as described above.

Such a melt blending can be conducted by adding the ultraviolet absorbent at a temperature higher than a melting temperature of the polymer, with employing a melt blending apparatus such as uniaxis or dual axis extruder. In a case where a dispersion liquid is used for the melt blending, the blending can be conducted by adding the dispersion liquid while pressurizing and then removing the organic solvent thereafter.

The ultraviolet absorbent may be added to the thermoplastic resin in the molten state, followed by kneading, in a film formation process. This method is preferable since it is possible to suppress a deterioration of the thermoplastic resin by reducing heat history.

When use is made of a melt polymerizable thermoplastic resin, for example, a thermoplastic polyester such as polyethylene terephthalate, polyethylenenaphthalate or so, the dispersion liquid of the ultraviolet absorbent may be added either before the polymerization or during the polymerization. The ultraviolet absorbent may be added singly, or may be added in a state dispersed in a solvent in advance. With regard to the solvent in this case, a raw material for the polymer is preferable. The polymerization reaction may be conducted in accordance with usual polymerization condition of polymers.

The desired ultraviolet-absorbent-containing polymer can be also obtained by adopting the thermoplastic resin containing the ultraviolet absorbent in a relatively high concentration of 0.5 to 50% by mass, prepared with the above-mentioned method, as a masterbatch, and by further allowing the masterbatch to be kneaded into a thermoplastic resin to which the ultraviolet absorbent is not added yet.

The polymer film of the present invention is an embodiment where the above-described formed resin article of the present invention has a film form. The content of ultraviolet absorbent, light transmittance at 410 nm, light transmittance at 440 nm, light transmittance at 430 nm, and their preferable ranges are the same as those described above with respect to the above-described formed resin article of the present invention.

The thermoplastic resin containing an ultraviolet absorbent can be manufactured into a form of film by a molten film formation method. The temperature of the molten film formation is preferably in a range from a flow beginning temperature (a glass transition temperature in the case of amorphous resin, and a melting point in the case of crystalline resin) to 450° C., more preferably from a flow beginning temperature to 400° C., and further preferably from a flow beginning temperature to 350° C. If the temperature of the molten film production is too lower than the flow beginning temperature, the molten film production becomes difficult, which is not favorable. On the other hand, if the temperature of the molten film production is too high, there is a possibility that heat deterioration of the thermoplastic resin is caused, which is not favorable.

When a highly elastic film is to be produced, it is preferable that the polymer film is further subjected to a stretching process. As the stretching process, use can be made of hitherto known methods, for example, a method of stretching in the uniaxial or biaxial direction sequentially or simultaneously. The stretching temperature is preferably from a glass transition temperature to the "glass transition temperature +90° C.", more preferably from a glass transition temperature to the "glass transition temperature +70° C.", and further preferably from a glass transition temperature to the "glass transition temperature +60° C.". If the stretching temperature is too low or too high, it is difficult to produce an uniform film, which is not favorable. The draw ratio is preferably from 1.5 times to 100 times in terms of area ratio. The draw ratio in the present invention is defined by (area of film after stretching)/(area of film before stretching). When the polymer is oriented by stretching, elasticity of the film is further enhanced to obtain a highly elastic film, which is favorable.

When the thermoplastic resin is crystalline, it is preferable that the thermoplastic resin is subjected to a heat treatment after stretching orientation of the film. The temperature of the heat treatment is preferably from a glass transition temperature of polyester to a melting point thereof. A further suitable temperature can be determined in consideration of the crystallization temperature of the obtained film, physical properties of the obtained film and the like.

The thickness of the polymer film of the present invention is preferably from 1 to 500 μm, more preferably from 5 to 400 μm, and particularly preferably from 10 to 300 μm. If the thickness is in the above-described range, the polymer film of the present invention is able to absorb ultraviolet rays sufficiently and therefore is effective as a light resistant film.

The resin composition of the present invention is characterized in that the compound represented by the above-described formula (1) is contained in a polymer substance. Preferable substituents and specific examples of the compound represented by formula (1), and polymer substances are the same as those described in order to explain the formed resin article. The resin composition of the present invention can be used for production of the formed resin article (various materials and formed articles) of the present invention and the polymer film of the present invention. The formed resin article and resin composition of the present invention are applicable to any application where a synthetic resin is used, and particularly favorably to applications where there is possibility of exposure to light such as sunlight or ultraviolet light. Specific examples thereof include surface-coating agents for glass alternatives; coating agents for the window glass, lighting glass, and light-source-protecting glass such as of house, facility, and vehicle; window films such as of house, facility, and vehicle; interior and exterior materials such as of house, facility, and vehicle; materials for ultraviolet-emission light sources such as fluorescent lamp and mercury lamp; materials for precision machines and electric and electronic devices; materials for shielding electromagnetic and other waves emitted from various displays; containers or packaging materials for foods, chemicals, and drugs; special packages such as bottle, box, blister, and cup; compact disk coating; agricultural or industrial sheet or film; protective film for polymer supports (e.g., plastic parts such as mechanical and automotive parts); print over-coating, inkjet medium film, delustered laminate film, optical light film, safety glass/front glass intermediate layer, electrochromic/photochromic film, over-lamination film, solar-heat-controlling film; optical materials such as optical filter, backlight display film, prism, mirror, and photographic material; mold film, transfer-type sticker, anti-graffiti film, stationery products such as tape; display plates and devices and the surface-coating agents thereof, substrates for solar cells; and the like.

The intermediate film of the present invention may be any of a film used in a form sandwiched between one substrate and another substrate. Specific examples of the intermediate film include a polymer film to be used in a form sandwiched between laminated glasses.

EXAMPLES

The present invention will be described in more detail based on the following examples, but the invention is not intended to be limited thereby.

Example 1

A pellet of polyethylene terephtharate (PET) having an intrinsic viscosity of 0.78 that had been dried at 170° C. for 6 hours and exemplified compound (1) were mixed, and the resultant mixture was put in an extruder. Melt kneading was carried out at a melting temperature of 280° C., to obtain a pellet containing an ultraviolet absorbent. The thus-obtained pellet and polyethylene terephtharate were mixed so that the content of the ultraviolet absorbent was 0.5 g/m$^2$, and then melt kneading was performed at a temperature of 280° C., to obtain a film with a thickness of 100 μm.

The maximum absorption wavelength of the exemplified compound (1) measured in a solution of the compound was measured by preparing a solution of the compound dissolved in ethyl acetate as a solvent so as to be a concentration of 2×10$^{-5}$ M, and measuring the solution using a spectrophotometer UV-3600 (trade name, manufactured by Shimadzu Corporation). It was found that the maximum absorption wavelength of the exemplified compound (1) measured in a solution was 375 nm.

Example 2

A film was prepared in the same manner as in Example 1, except that the addition amount of the exemplified compound (1) in Example 1 was changed to 1.0 g/m$^2$.

Example 3

A film was prepared in the same manner as in Example 1, except that the addition amount of the exemplified compound (1) in Example 1 was changed to 4.0 g/m$^2$.

Example 4

A film was prepared in the same manner as in Example 1, except that the exemplified compound (1) in Example 1 was changed to the exemplified compound (5).

The maximum absorption wavelength of the exemplified compound (5) measured in a solution was measured in the same manner as in Example 1, and it was 392 nm.

Example 5

A film was prepared in the same manner as in Example 1, except that the exemplified compound (1) in Example 1 was changed to the exemplified compound (17).

The maximum absorption wavelength of the exemplified compound (17) measured in a solution was measured in the same manner as in Example 1, and it was 361 nm.

Example 6

A film was prepared in the same manner as in Example 1, except that the exemplified compound (1) in Example 1 was changed to the exemplified compound (21).

The maximum absorption wavelength of the exemplified compound (21) measured in a solution was measured in the same manner as in Example 1, and it was 357 nm.

Example 7

A film was prepared in the same manner as in Example 1, except that the exemplified compound (1) in Example 1 was changed to the exemplified compound (31).

The maximum absorption wavelength of the exemplified compound (31) measured in a solution was measured in the same manner as in Example 1, and it was 383 nm.

Example 8

A pellet of polycarbonate (PC) and exemplified compound (1) were mixed, and the resultant mixture was put in an extruder. Melt kneading was carried out at a melting temperature of 300° C., to obtain a pellet containing an ultraviolet absorbent. The thus-obtained pellet and polycarbonate were mixed so that the content of the ultraviolet absorbent was 0.5 g/m$^2$, and then melt kneading was performed at a temperature of 300° C., to obtain a film with a thickness of 100 μm.

Example 9

A pellet of polyethylene naphthalate (PEN) and exemplified compound (1) were mixed, and the resultant mixture was put in an extruder. Melt kneading was carried out at a melting temperature of 305° C., to obtain a pellet containing an ultraviolet absorbent. The thus-obtained pellet and polyethylene naphthalate were mixed so that the content of the ultraviolet absorbent was 0.5 g/m$^2$, and then melt kneading was performed at a temperature of 305° C., to obtain a film with a thickness of 100 μm.

Example 10

A pellet of polyethersulfone (PES) and exemplified compound (1) were mixed, and the resultant mixture was put in an extruder. Melt kneading was carried out at a melting temperature of 350° C., to obtain a pellet containing an ultraviolet absorbent. The thus-obtained pellet and polyethersulfone were mixed so that the content of the ultraviolet absorbent was 0.5 g/m$^2$, and then melt kneading was performed at a temperature of 350° C., to obtain a film with a thickness of 100 μm.

Example 11

A pellet of polymethyl methacrylate (PMMA) and exemplified compound (1) were mixed, and the resultant mixture was put in an extruder. Melt kneading was carried out at a melting temperature of 240° C., to obtain a pellet containing an ultraviolet absorbent. The thus-obtained pellet and polymethyl methacrylate were mixed so that the content of the ultraviolet absorbent was 0.5 g/m², and then melt kneading was performed at a temperature of 240° C., to obtain a film with a thickness of 100 μm.

Example 12

A film was prepared in the same manner as in Example 1, except that the addition amount of the exemplified compound (1) in Example 1 was changed to 5.0 g/m².

Example 13

A film was produced in the same manner as in Example 1, except that the thickness of the film in Example 1 was changed to 25 μm.

Example 14

A film was produced in the same manner as in Example 1, except that the thickness of the film in Example 1 was changed to 200 μm.

Example 15

A pellet of polybutylene terephthalate (PBT) and exemplified compound (1) were mixed, and the resultant mixture was put in an extruder. Melt kneading was carried out at a melting temperature of 280° C., to obtain a pellet containing an ultraviolet absorbent. The thus-obtained pellet and polybutylene terephthalate were mixed so that the content of the ultraviolet absorbent was 0.5 g/m², and then melt kneading was performed at a temperature of 350° C., to obtain a film with a thickness of 100 μm.

Comparative Example 1

A film was produced in the same manner as in Example 1, except that the exemplified compound (1) in Example 1 was not added.

Comparative Example 2

A film was prepared in the same manner as in Example 1, except that the addition amount of the exemplified compound (1) in Example 1 was changed to 8.0 g/m².

Comparative Example 3

Twenty (20) % by mass of polymethylmethacrylate (PMMA) was dissolved in tetrahydrofuran, to prepare a binder solution. Next, the following Comparative compound A (Me represents a methyl group) was dissolved in the resultant binder solution, to prepare a coating liquid. A polyethylene terephtharate film with a thickness of 100 μm was prepared as a substrate. The above-described coating liquid was coated on the substrate using a coater, and then dried for 1 hour at 70° C., to form a coating with a film thickness of 50 μm, thereby producing a film. The content of the Comparative compound A in the film was 10.8 g/m².

The maximum absorption wavelength of the Comparative compound A measured in a solution was measured in the same manner as in Example 1, and it was 352 nm.

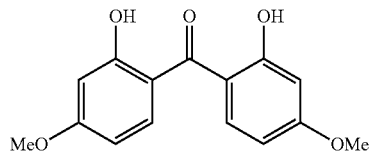

(Comparative compound A)

Comparative Example 4

A film was produced in the same manner as in Comparative example 3, except that the thickness of the film in Comparative example 3 was changed to 5 μm.

Comparative Example 5

A film was produced in the same manner as in Example 12, except that the exemplified compound (1) in Example 12 was changed to the following Comparative compound B.

The maximum absorption wavelength of the Comparative compound B measured in a solution was measured in the same manner as in Example 1, and it was 346 nm.

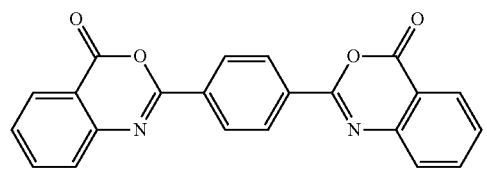

(Comparative compound B)

<Evaluation>

Light Resistance

Each of the thus-produced films was irradiated to light so that illumination intensity of a xenon lamp was 170,000 lux. After 1000-hour irradiation, light transmittance of each film at the wavelengths of 410 nm, 430 nm, and 440 nm respectively was measured using a spectrophotometer UV-3600 (trade name, manufactured by Shimadzu Corporation). After irradiation, the haze value of each film was measured using a haze meter. A difference in the haze value between before and after the irradiation was evaluated according to the following criterion.

A: Haze value after irradiation/Haze value before irradiation ≦2.0 . . . Light resistance is extremely fair.

B: 2.0<Haze value after irradiation/Haze value before irradiation ≦3.0 . . . Light resistance is fair.

C: 3.0<Haze value after irradiation/Haze value before irradiation . . . Light resistance is poor.

Tinge of Film

The tinge of the thus-produced film was visually observed. Of the tinges, a yellow tinge was evaluated.

A: Almost colorless and favorable tinge.

B: There is a problem of yellow coloration.

The results are shown in Table 7.

TABLE 7

| | Compound | Polymer substance | Thickness of film (μm) | Content of ultraviolet absorbent (g/m²) | Light transmittance (%) | | | Light resistance | Tinge of film |
|---|---|---|---|---|---|---|---|---|---|
| | | | | | 410 nm | 430 nm | 440 nm | | |
| Example 1 | Exemplified compound (1) | PET | 100 | 0.5 | 0.4 | 81.8 | 88.2 | A | A |
| Example 2 | Exemplified compound (1) | PET | 100 | 1.0 | 0.1 | 73.5 | 85.7 | A | A |
| Example 3 | Exemplified compound (1) | PET | 100 | 4.0 | 0.0 | 71.4 | 83.1 | A | A |
| Example 4 | Exemplified compound (5) | PET | 100 | 0.5 | 0.4 | 75.4 | 86.0 | A | A |
| Example 5 | Exemplified compound (17) | PET | 100 | 0.5 | 0.9 | 87.1 | 89.0 | A | A |
| Example 6 | Exemplified compound (21) | PET | 100 | 0.5 | 0.4 | 83.5 | 88.4 | A | A |
| Example 7 | Exemplified compound (31) | PET | 100 | 0.5 | 0.4 | 77.0 | 87.5 | A | A |
| Example 8 | Exemplified compound (1) | PC | 100 | 0.5 | 0.3 | 85.9 | 88.9 | A | A |
| Example 9 | Exemplified compound (1) | PEN | 100 | 0.5 | 0.2 | 81.2 | 87.9 | A | A |
| Example 10 | Exemplified compound (1) | PES | 100 | 0.5 | 0.2 | 77.7 | 87.6 | A | A |
| Example 11 | Exemplified compound (1) | PMMA | 100 | 0.5 | 0.3 | 84.3 | 88.6 | A | A |
| Example 12 | Exemplified compound (1) | PET | 100 | 5.0 | 0.0 | 70.6 | 81.9 | A | A |
| Example 13 | Exemplified compound (1) | PET | 25 | 0.5 | 0.4 | 85.6 | 89.0 | A | A |
| Example 14 | Exemplified compound (1) | PET | 200 | 0.5 | 0.4 | 79.4 | 88.0 | A | A |
| Example 15 | Exemplified compound (1) | PBT | 100 | 0.5 | 0.4 | 82.1 | 88.5 | A | A |
| Comparative example 1 | — | PET | 100 | — | 89.0 | 89.2 | 89.3 | C | A |
| Comparative example 2 | Exemplified compound (1) | PET | 100 | 8.0 | 0.0 | 61.4 | 72.1 | A | B |
| Comparative example 3 | Comparative compound A | PMMA | 50 | 10.8 | 4.7 | 63.2 | 76.0 | B | B |
| Comparative example 4 | Comparative compound A | PMMA | 50 | 5.0 | 21.6 | 79.4 | 87.2 | B | B |
| Comparative example 5 | Comparative compound B | PET | 100 | 5.0 | 77.6 | 85.2 | 85.7 | B | A |

As is apparent from the results shown in Table 7, it was found that the film of Comparative example 1 containing absolutely no ultraviolet absorbent had poor light resistance. Further, with respect to the film of Comparative example 2, the surface of the film was stained with the ultraviolet absorbent bleeding out of the film so that the surface of the film looked white. As a result, the film had no suitability to an ultraviolet-absorbing film. Besides, the films of Comparative examples 3 and 4 each containing Comparative compound A (an existing ultraviolet absorbent having an absorption in the UV-A range) were not so problematic with respect to light resistance. However, these films had low light transmittance at the wavelengths of 430 nm and 440 nm, respectively. Further, the film of Comparative example 5 containing Comparative compound B had almost no ability to cut off light at 410 nm, and had poor light resistance.

In contrast, it was found that the films of the present invention each had low light transmittance at 410 nm, and they each had high light transmittance at 430 nm and 440 nm respectively, and these films were resistant to decomposition by light irradiation.

Example 16

A pellet of polycarbonate (PC) and exemplified compound (1) were mixed, and the resultant mixture was put in an extruder. Melt kneading was carried out at a melting temperature of 300° C., to obtain a pellet containing an ultraviolet absorbent. The thus-obtained pellet and polycarbonate were mixed, so that the content of the ultraviolet absorbent was 0.5 g/m², and then injection molding was performed at a temperature of 300° C., to obtain a formed article with a thickness of 1 mm.

Example 17

A formed article was prepared in the same manner as in Example 16, except that the thickness of the formed article in Example 16 was changed to 5 mm.

Example 18

A formed article was prepared in the same manner as in Example 16, except that the thickness of the formed article in Example 16 was changed to 10 mm.

Example 19

A pellet of polymethyl methacrylate (PMMA) and exemplified compound (1) were mixed, and the resultant mixture was put in an extruder. Melt kneading was carried out at a melting temperature of 240° C., to obtain a pellet containing an ultraviolet absorbent. The thus-obtained pellet and polymethyl methacrylate were mixed, so that the content of the ultraviolet absorbent was 0.5 g/m², and then injection molding was performed at a temperature of 240° C., to obtain a formed article with a thickness of 1 mm.

Example 20

A formed article was prepared in the same manner as in Example 19, except that the thickness of the formed article in Example 19 was changed to 5 mm.

Example 21

A formed article was prepared in the same manner as in Example 19, except that the thickness of the formed article in Example 20 was changed to 10 mm.

<Evaluation>
Light Resistance

Each of the thus-produced formed articles was irradiated to light so that illumination intensity of a xenon lamp was 170,000 lux. After 1000-hour irradiation, light transmittance of each film at the wavelengths of 410 nm, 430 nm, and 440 nm respectively was measured using a spectrophotometer UV-3600 (trade name, manufactured by Shimadzu Corporation). After irradiation, the haze value of each formed article was measured using a haze meter. A difference in the haze value between before and after the irradiation was evaluated according to the following criterion.

A: Haze value after irradiation/Haze value before irradiation ≦2.0 ... Light resistance is extremely fair.
B: 2.0<Haze value after irradiation/Haze value before irradiation ≦3.0 ... Light resistance is fair.
C: 3.0<Haze value after irradiation/Haze value before irradiation ... Light resistance is poor.

Tinge of Formed Article

The tinge of the thus-produced formed article was visually observed. Of the tinges, a yellow tinge was evaluated.
A: Almost colorless and favorable tinge.
B: There is a problem of yellow coloration.

The results are shown in Table 8.

wherein the compound is represented by formula (3):

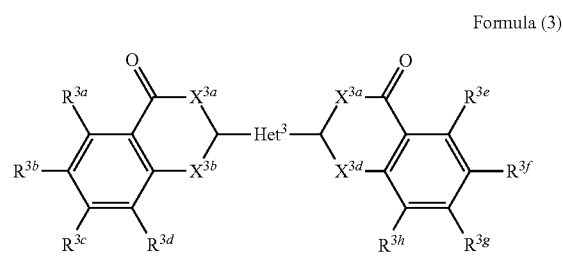

Formula (3)

TABLE 8

|  | Compound | Polymer | Thickness of formed article (μm) | Content of ultraviolet absorbent (g/m²) | Light transmittance (%) | | | Light resistance | Tinge of formed article |
| --- | --- | --- | --- | --- | --- | --- | --- | --- | --- |
|  |  |  |  |  | 410 nm | 430 nm | 440 nm |  |  |
| Example 16 | Exemplified compound (1) | PC | 1 | 0.5 | 0.3 | 84.5 | 87.7 | A | A |
| Example 17 | Exemplified compound (1) | PC | 5 | 0.5 | 0.3 | 84.2 | 87.5 | A | A |
| Example 18 | Exemplified compound (1) | PC | 10 | 0.5 | 0.3 | 84.0 | 88.4 | A | A |
| Example 19 | Exemplified compound (1) | PMMA | 1 | 0.5 | 0.3 | 83.3 | 87.2 | A | A |
| Example 20 | Exemplified compound (1) | PMMA | 5 | 0.5 | 0.3 | 82.9 | 87.0 | A | A |
| Example 21 | Exemplified compound (1) | PMMA | 10 | 0.5 | 0.3 | 82.7 | 86.8 | A | A |

As is apparent from the results shown in Table 8, it was found that the formed articles of the present invention each had low light transmittance at 410 nm, and they each had high light transmittance at 430 nm and 440 nm respectively, and these formed articles were resistant to decomposition by light irradiation.

As is apparent from the results shown in Tables 7 and 8, since the formed resin articles of the present invention each have low light transmittance at 410 nm, and they each have high light transmittance at 430 nm and 440 nm respectively, and these articles are resistant to decomposition by light irradiation, it is thought that the formed resin articles of the present invention are effective to application of solar cells.

Having described our invention as related to the present embodiments, it is our intention that the invention not be limited by any of the details of the description, unless otherwise specified, but rather be construed broadly within its spirit and scope as set out in the accompanying claims.

This non-provisional application claims priority under 35 U.S.C. §119 (a) on Patent Application No. 2008-088954 filed in Japan on Mar. 30, 2008, Patent Application No. 2008-284545 filed in Japan on Nov. 5, 2008, and Patent Application No. 2009-026031 filed in Japan on Feb. 6, 2009, each of which is entirely herein incorporated by reference.

The invention claimed is:

1. A resin article, formed from a composition comprising a compound and a polymer substance,
    wherein the compound has a maximum absorption wavelength in a range of 400 nm or less, measured in a solution of the compound,
    wherein the compound is contained in the polymer substance in a quantity of 5 g/m² or less, and
    wherein a light transmittance of the article at a wavelength of 410 nm is 5% or less;
    wherein the compound is represented by formula (3):

wherein $Het^3$ represents a bivalent group selected from the group consisting of pyrrole, pyrazole, imidazole, 1,2,3-triazole, 1,2,4-triazole, pyridine, pyridazine, pyrimidine, pyrazine, 1,3,5-triazine, furan, thiophene, oxazole, isoxazole, thiazole, isothiazole, 1,2,3-oxadiazole, and 1,3,4-thiadiazole;

$X^{3a}$, $X^{3b}$, $X^{3c}$, and $X^{3d}$ each independently represent a hetero atom selected from the group consisting of a nitrogen, an oxygen, and a sulfur atom; and $R^{3a}$, $R^{3b}$, $R^{3c}$, $R^{3d}$, $R^{3e}$, $R^{3f}$, $R^{3g}$, and $R^{3h}$ each independently represent a hydrogen atom or a monovalent substituent group selected from the group consisting of a halogen atom, an alkyl group having 1 to 20 carbon atoms, an aryl group having 6 to 20 carbon atoms, a cyano group, a carboxyl group, an alkoxycarbonyl group, an aryloxycarbonyl group, a substituted or unsubstituted carbamoyl group, an alkylcarbonyl group, an arylcarbonyl group, a nitro group, a substituted or unsubstituted amino group, an acylamino group, a sulfonamido group, an imido group, an imino group, a hydroxy group, an alkoxy group having 1 to 20 carbon atom, an aryloxy group, an acyloxy group, an alkylsulfonyloxy group, an arylsulfonyloxy group, a sulfo group, a substituted or unsubstituted sulfamoyl group, an alkylthio group, an arylthio group, an alkylsulfonyl group, an arylsulfonyl group, and a heterocyclic group having 6 to 20 carbon atoms, wherein a light transmittance of the article at a wavelength of 440 nm is 80% or more, and wherein a light transmittance of the article at a wavelength of 430 nm is 70% or more.

2. The formed resin article according to claim 1, wherein the compound represented by formula (3) is a compound represented by formula (4):

Formula (4)

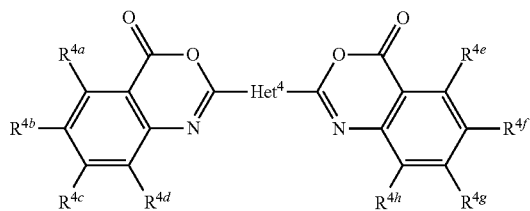

wherein Het$^4$ has the same meaning as Het$^3$ in formula (3) above;

R$^{4a}$, R$^{4b}$, R$^{4c}$, R$^{4d}$, R$^{4e}$, R$^{4f}$, R$^{4g}$, and R$^{4h}$, each have the same meanings as R$^{3a}$, R$^{3b}$, R$^{3c}$, R$^{3d}$, R$^{3e}$, R$^{3f}$, R$^{3g}$, and R$^{3h}$ in formula (3) above.

3. A polymer film, comprising a compound and a polymer substance,
wherein the compound has a maximum absorption wavelength in a range of 400 nm or less, measured in a solution of the compound,
wherein the compound is contained in the polymer substance in a quantity of 5 g/m$^2$ or less, and
wherein a light transmittance of the polymer film at a wavelength of 410 nm is 5% or less;
wherein the compound is represented by formula (3):

Formula (3)

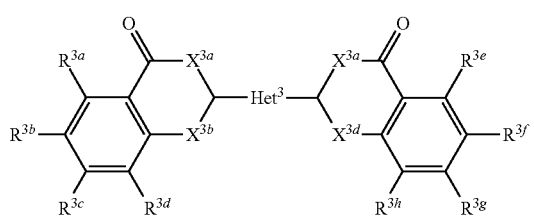

wherein Het$^3$ represents a bivalent and five- or six-membered aromatic heterocyclic residue, and the aromatic heterocycles prepared by adding two hydrogen atoms to the bivalent aromatic heterocyclic residue include pyrrole, pyrazole, imidazole, 1,2,3-triazole, 1,2,4-triazole, pyridine, pyridazine, pyrimidine, pyrazine, 1,3,5-triazine, furan, thiophene, oxazole, isoxazole, thiazole, isothiazole, 1,2,3-oxadiazole, and 1,3,4-thiadiazole;

X$^{3a}$, X$^{3b}$, X$^{3c}$, and X$^{3d}$ each independently represent a hetero atom selected from the group consisting of a nitrogen, an oxygen, and a sulfur atom; and R$^{3a}$, R$^{3b}$, R$^{3c}$, R$^{3d}$, R$^{3e}$, R$^{3f}$, R$^{3g}$, and R$^{3h}$ each independently represent a hydrogen atom or a monovalent substituent group selected from the group consisting of a halogen atom, an alkyl group having 1 to 20 carbon atoms, an aryl group having 6 to 20 carbon atoms, a cyano group, a carboxyl group, an alkoxycarbonyl group, an aryloxycarbonyl group, a substituted or unsubstituted carbamoyl group, an alkylcarbonyl group, an arylcarbonyl group, a nitro group, a substituted or unsubstituted amino group, an acylamino group, a sulfonamido group, an imido group, an imino group, a hydroxy group, an alkoxy group having 1 to 20 carbon atom, an aryloxy group, an aryloxy group, an alkylsulfonyloxy group, an arylsulfonyloxy group, a sulfo group, a substituted or unsubstituted sulfamoyl group, an alkylthio group, an arylthio group, an alkylsulfonyl group, an arylsulfonyl group, and a heterocyclic group having 6 to 20 carbon atoms.

4. The polymer film according to claim 3, wherein a light transmittance at a wavelength of 440 nm is 80% or more.

5. The polymer film according to claim 3, wherein a light transmittance at a wavelength of 430 nm is 70% or more.

6. The polymer film according to claim 3, wherein the compound represented by formula (3) is a compound represented by formula (4):

Formula (4)

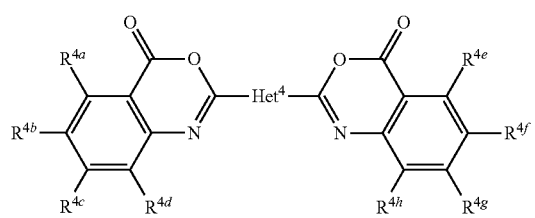

wherein Het$^4$ has the same meaning as Het$^3$ in formula (3) above;

R$^{4a}$, R$^{4b}$, R$^{4c}$, R$^{4d}$, R$^{4e}$, R$^{4f}$, R$^{4g}$, and R$^{4h}$, each have the same meanings as R$^{3a}$, R$^{3b}$, R$^{3c}$, R$^{3d}$, R$^{3e}$, R$^{3f}$, R$^{3g}$, and R$^{3h}$ in formula (3) above.

7. The polymer film according to claim 6, wherein the compound represented by formula (4) is a compound represented by formula (5):

Formula (5)

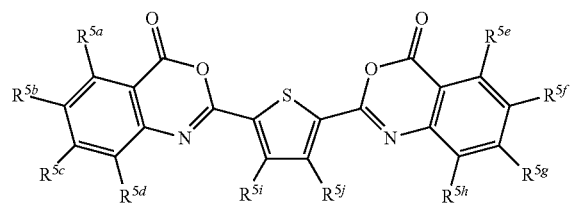

wherein R$^{5a}$, R$^{5b}$, R$^{5c}$, R$^{5d}$, R$^{5e}$, R$^{5f}$, R$^{5g}$, and R$^{5h}$ each have the same meanings as R$^{4a}$, R$^{4b}$, R$^{4c}$, R$^{4d}$, R$^{4e}$, R$^{4f}$, R$^{4g}$, and R$^{4h}$ in formula (4) above; R$^{5i}$ and R$^{5j}$ each independently represent a hydrogen atom or a monovalent substituent group.

8. The polymer film according to claim 3, wherein the polymer substance is a polyester, a polycarbonate, or an acrylic resin.

9. The polymer film according to claim 3, wherein the polymer substance is a polyethylene terephthalate, a polyethylene naphthalate, a polycarbonate, or a polymethylmethacrylate.

10. A solar cell comprising the polymer film according to claim 3.

11. An intermediate film comprising the polymer film according to claim 3.

12. The formed resin article according to claim 1, wherein the compound is selected from the group consisting of
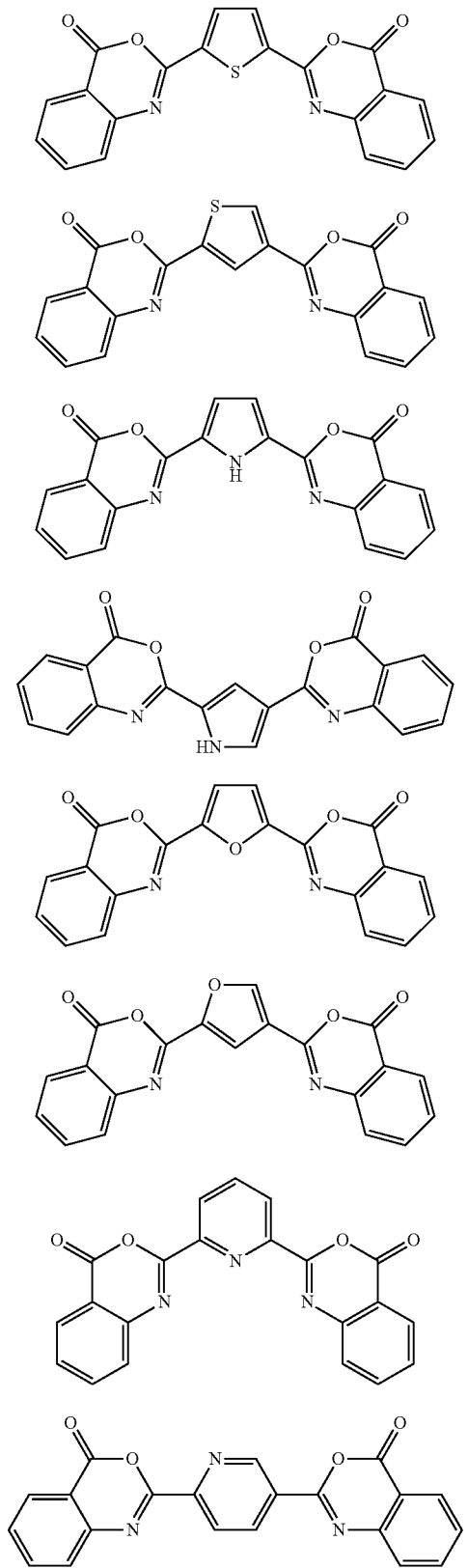
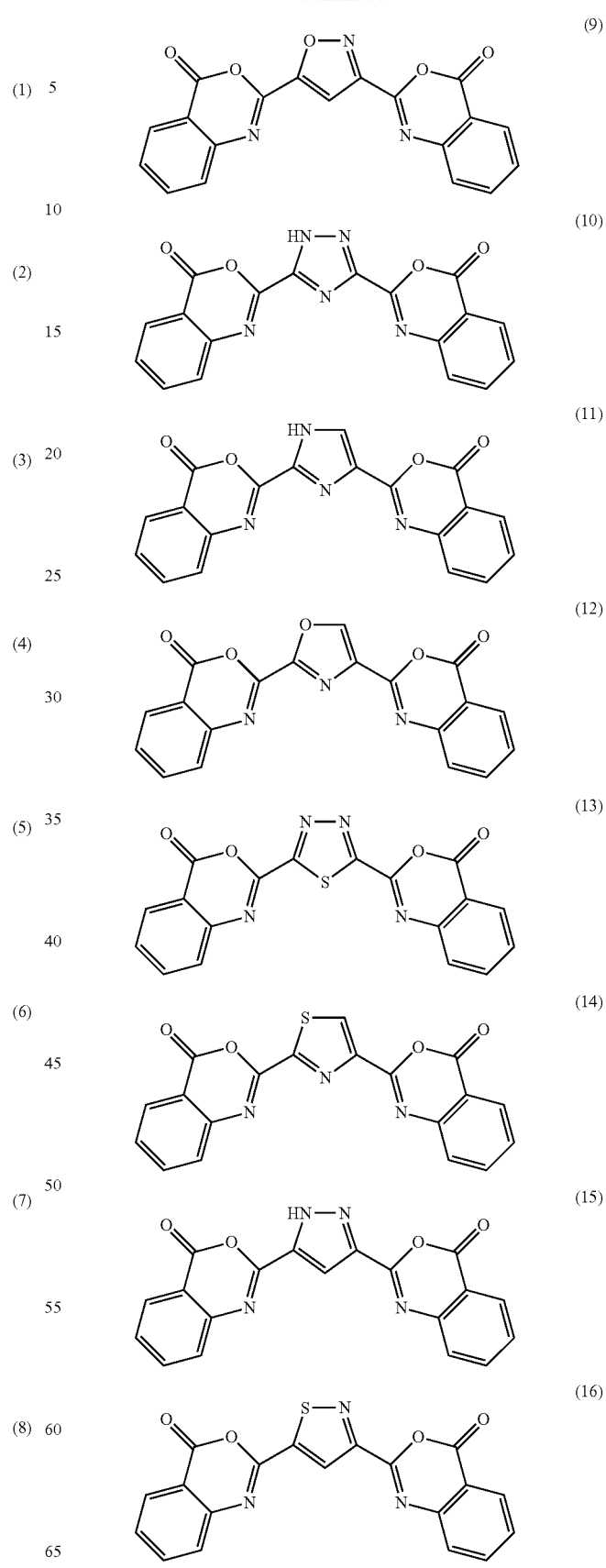

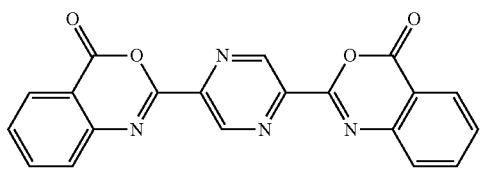
(17)
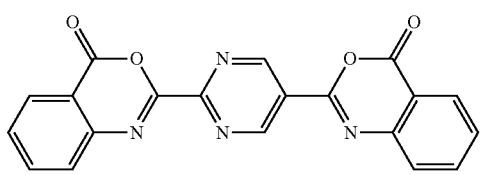
(18)
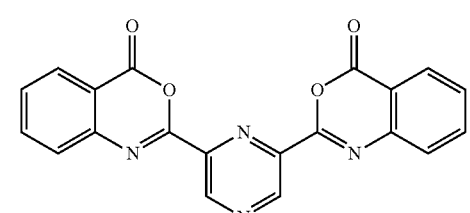
(19)
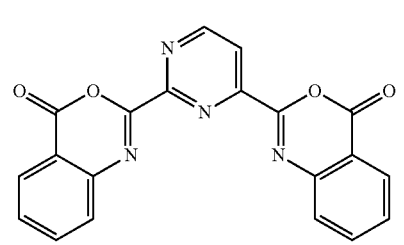
(20)
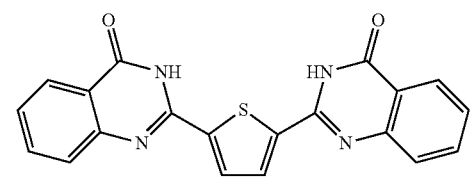
(21)
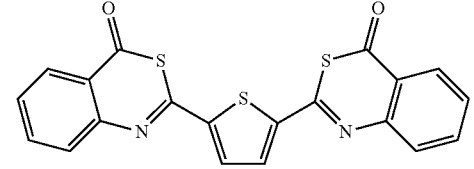
(22)
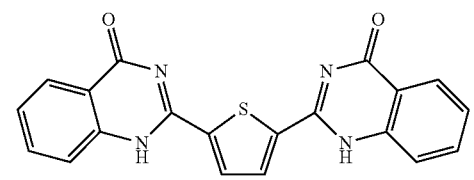
(23)
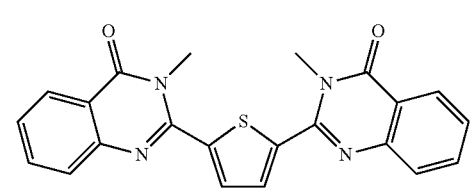
(24)
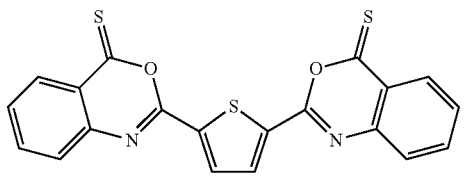
(25)
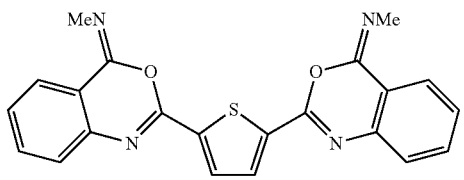
(26)
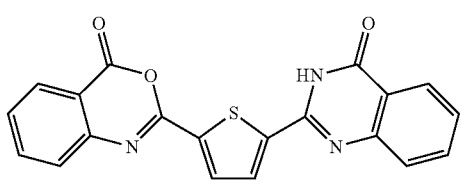
(27)
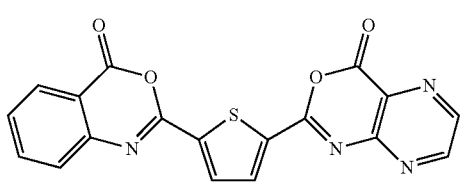
(28)
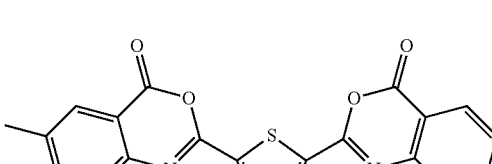
(29)
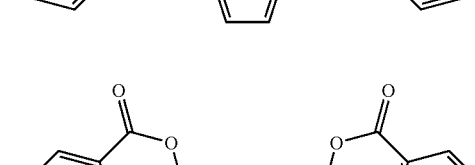
(30)
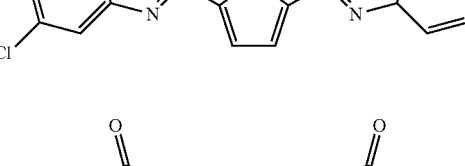
(31)
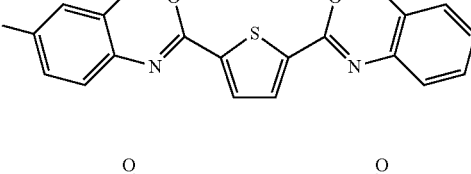
(32)
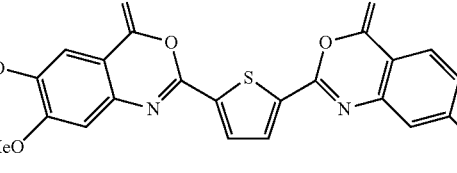

-continued
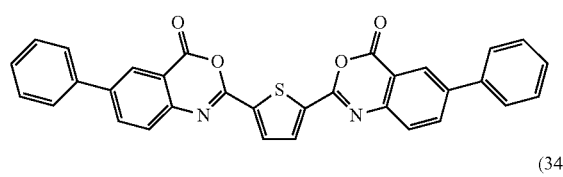
(33)
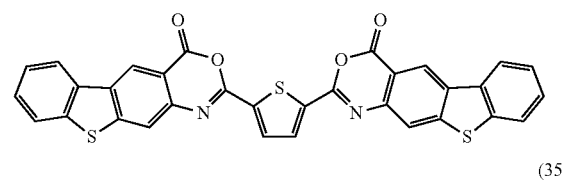
(34)
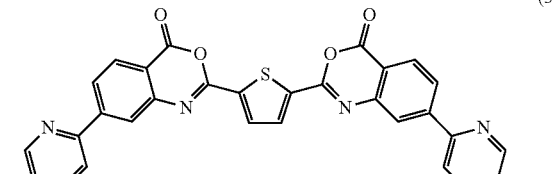
(35)
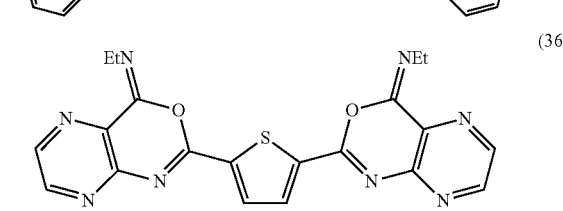
(36)
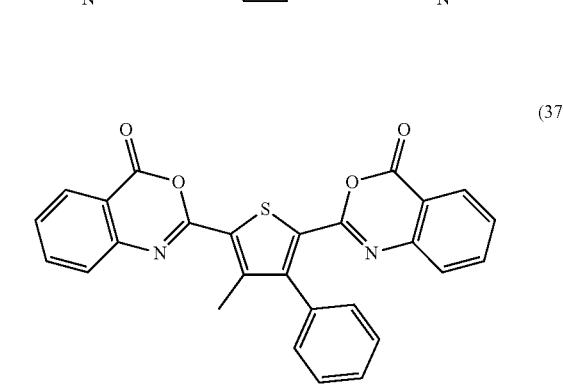
(37)
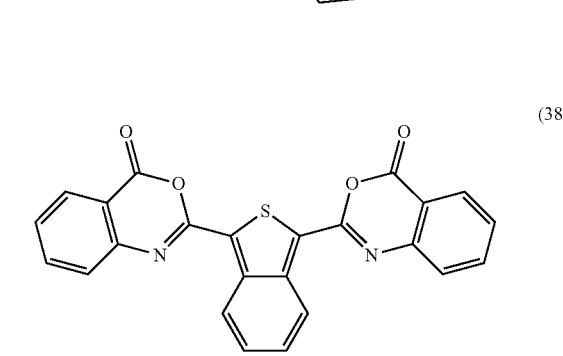
(38)
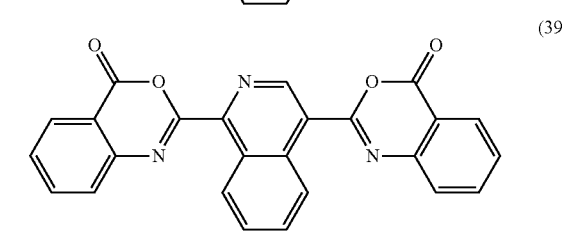
(39)
-continued
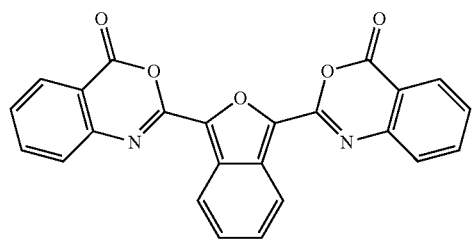
(40)
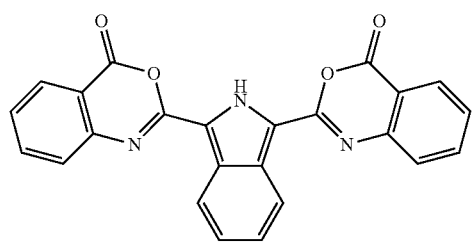
(41)
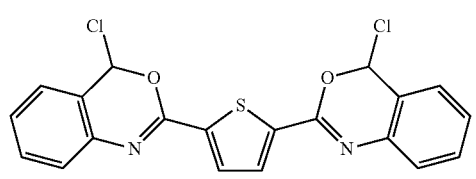
(42)
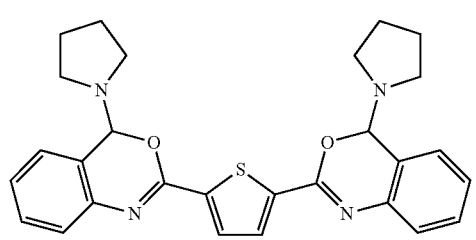
(43)
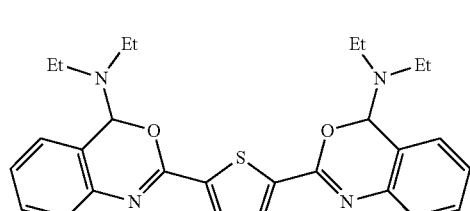
(44)
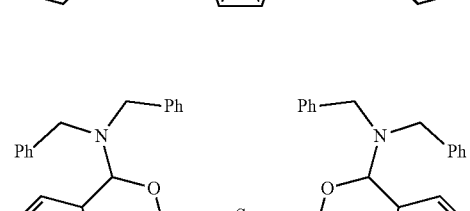
(45)
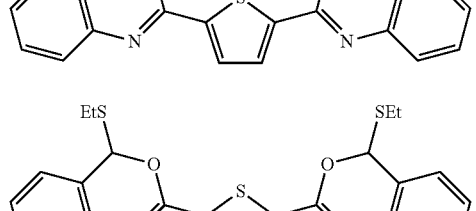
(46)
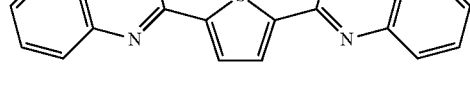

-continued
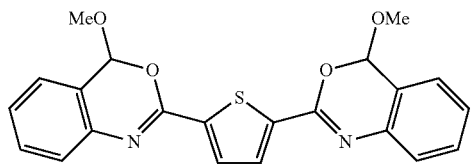
(47)
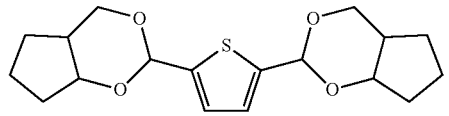
(48)
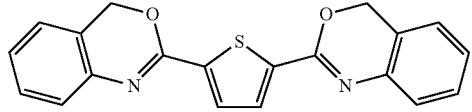
(49)
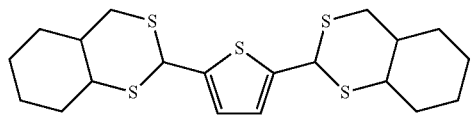
(50)
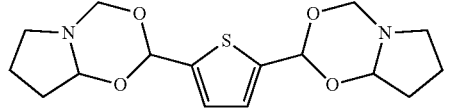
(51)
* * * * *